United States Patent
Gheorghiu et al.

(10) Patent No.: US 11,363,493 B2
(45) Date of Patent: Jun. 14, 2022

(54) CARRIER AGGREGATION CONFIGURATIONS IN WIRELESS SYSTEMS

(71) Applicant: QUALCOMM Incorporated, San Diego, CA (US)

(72) Inventors: Valentin Alexandru Gheorghiu, Tokyo (JP); Marco Papaleo, Bologna (IT); Masato Kitazoe, Hachiouji (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/055,654

(22) Filed: Aug. 6, 2018

(65) Prior Publication Data
US 2019/0069198 A1 Feb. 28, 2019

Related U.S. Application Data

(60) Provisional application No. 62/549,344, filed on Aug. 23, 2017.

(51) Int. Cl.
*H04W 28/06* (2009.01)
*H04L 5/00* (2006.01)
(Continued)

(52) U.S. Cl.
CPC .......... *H04W 28/065* (2013.01); *H04L 5/001* (2013.01); *H04W 16/14* (2013.01);
(Continued)

(58) Field of Classification Search
CPC ... H04W 28/065; H04W 16/14; H04W 76/27; H04W 72/0453; H04W 72/042; H04L 5/001; H04L 5/0053
See application file for complete search history.

(56) References Cited

U.S. PATENT DOCUMENTS

2012/0093124 A1* 4/2012 Zhang .................. H04L 5/0035
370/330
2013/0148591 A1* 6/2013 Lim .................. H04W 72/0453
370/329
(Continued)

FOREIGN PATENT DOCUMENTS

CA 2834556 A1 11/2012
CN 103959826 A 7/2014
(Continued)

OTHER PUBLICATIONS

Guangdong OPPO Mobile Telecom: "Bandwidth Part Based Resource Scheduling for Carrier Aggregation," 3GPP Draft; R1-1713265, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051316072, 4 pages, Retrieved from the Internet: URL:http://www.3gpp.org/ftp/Meetings_3GPP_SUNC/RAN1/Docs/ [retrieved on Aug. 20, 2017].
(Continued)

*Primary Examiner* — Harry H Kim
(74) *Attorney, Agent, or Firm* — Holland & Hart LLP

(57) ABSTRACT

Methods, systems, and devices for wireless communications are described. A base station may configure a secondary component carrier (CC) for a user equipment (UE) which is not aligned on a valid channel raster entry. The location of the secondary CC may be indicated based on a reference location relative to another frequency or another CC. The reference location of the secondary CC may be the center of the new CC, an edge of the secondary CC, the position of a subcarrier within the secondary CC, or the position of a resource. In some examples, the reference location of the secondary CC may be indicated relative a currently used CC, an arbitrary channel entry, or an absolute frequency location. In some examples, the relative location may be provided in (Continued)

resource blocks or subcarriers and the subcarrier spacing (SCS). The base station may indicate the width of the secondary CC to the UE.

50 Claims, 14 Drawing Sheets

(51) Int. Cl.
*H04W 16/14* (2009.01)
*H04W 72/04* (2009.01)
*H04W 76/27* (2018.01)

(52) U.S. Cl.
CPC ....... *H04W 72/0453* (2013.01); *H04W 76/27* (2018.02); *H04L 5/0053* (2013.01); *H04W 72/042* (2013.01)

(56) References Cited

U.S. PATENT DOCUMENTS

| | | | | |
|---|---|---|---|---|
| 2013/0163543 | A1* | 6/2013 | Freda | H04W 72/0406 370/329 |
| 2014/0204867 | A1* | 7/2014 | Lim | H04L 5/0066 370/329 |
| 2015/0245329 | A1* | 8/2015 | Pan | H04L 5/0053 370/329 |
| 2016/0072614 | A1* | 3/2016 | Blankenship | H04L 5/0044 370/329 |
| 2016/0150541 | A1* | 5/2016 | Park | H04W 72/0453 370/329 |
| 2018/0310300 | A1* | 10/2018 | Lin | H04W 72/0413 |
| 2019/0028315 | A1* | 1/2019 | Park | H04L 27/2692 |
| 2019/0141705 | A1* | 5/2019 | Dalipi | H04L 5/003 |
| 2019/0246340 | A1* | 8/2019 | Jung | H04W 72/046 |
| 2019/0363809 | A1* | 11/2019 | Yoon | H04W 56/00 |

FOREIGN PATENT DOCUMENTS

| | | |
|---|---|---|
| CN | 104012159 A | 8/2014 |
| TW | 201707408 A | 2/2017 |
| WO | WO-2017135885 A1 | 8/2017 |

OTHER PUBLICATIONS

International Search Report and Written Opinion—PCT/US2018/045639—ISA/EPO—dated Oct. 16, 2018.
ITL: "Multiple SS Block Indication in Wideband CC," 3GPP Draft; R1-1711352, 3rd Generation Partnership Project (3GPP), Mobile Competence Centre; 650, Route Des Lucioles; F-06921 Sophia-Antipolis Cedex; France, vol. RAN WG1, No. Qingdao, P.R., China; Jun. 27, 2017-Jun. 30, 2017, Jun. 17, 2017, XP051305520, 5 pages, Retrieved from the Internet: URL:http://www.3gpp.org/ftp/tsg_ran/WG1_RL1/TSGR1_AH/NR_AH_1706/Docs/ [retrieved on Jun. 17, 2017].
NTT DOCOMO, et al., "Renaming Issues on Wider Bandwidth Operations for NR," 3GPP Draft; R1-1711131 Wider BW For NR, 3rd Generation Partnership Project (3GPP), Mobile Competence Centre; 650, Route Des Lucioles; F-06921 Sophia-Antipolis Cedex; France, vol. RAN WG1, No. Qingdao, P.R., China; Jun. 27, 2017-Jun. 30, 2017, Jun. 16, 2017, XP051304425, 6 pages, Retrieved from the Internet: URL:http://www.3gpp.org/ftp/tsg_ran/WG1/_RL1/TSGR1_AH/NR_AH_1706/Docs/ [retrieved on Jun. 16, 2017].
Taiwan Search Report—TW107127408—TIPO—dated Aug. 31, 2021.
Taiwan Search Report—TW107127408—TIPO—dated Jan. 18, 2022.

\* cited by examiner

CARRIER AGGREGATION CONFIGURATIONS IN WIRELESS SYSTEMS

CROSS REFERENCES

The present Application for Patent claims the benefit of U.S. Provisional Patent Application No. 62/549,344 by GHEORGHIU, et al., entitled "Carrier Aggregation Configurations in Wireless Systems," filed Aug. 23, 2017, assigned to the assignee hereof, and expressly incorporated herein.

BACKGROUND

The following relates generally to wireless communication, and more specifically to carrier aggregation configurations in wireless systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may utilize carrier aggregation techniques to transmit or receive information over multiple component carriers (CCs) within a system bandwidth or a wideband CC to increase throughput. In these systems, CCs and associated parameters for different cells may be limited by a channel raster (e.g., which may be predefined or preconfigured) such that a CC may only be configured on a valid channel raster entry. CCs may also be limited by spacing between subcarriers in the frequency domain or a location of the system band or wideband used for carrier aggregation.

SUMMARY

A user equipment (UE) and a base station may communicate using wideband carrier aggregation. The UE may be allocated a wideband component carrier (CC) and a primary cell (PCell) CC in the wideband CC. In some examples, the base station may configure a secondary CC which is not aligned on a valid channel raster entry, such that the base station may not be able to indicate the location of the secondary CC with a channel raster value. The location of the new, secondary CC may be signaled based on a reference location relative to another frequency or another CC. The reference location of the new CC may be the center of the new CC, an edge of the new CC, the position of a subcarrier within the new CC, or the position of a resource. In some other examples, the reference location of the new CC may be indicated relative to an edge frequency or the center frequency of the wideband CC. In some other examples, the reference location of the new CC may be relative to an arbitrary channel entry (e.g., a CC which the UE is not aware of). In some cases, the base station may transmit a reference location of the CC as an absolute frequency location.

In some examples, the relative location may be provided in resource blocks (RBs) or subcarriers and the subcarrier spacing (SCS). In some examples, the SCS may be implicit based on the SCS of a synchronization block (e.g., of the PCell), the wideband SCS, or explicitly indicated on the PCell. The base station may also indicate the width of the new CC to the UE. For example, the base station may indicate a number of RBs the UE may use and the relationship between the reference location and the RBs of the CC. For example, the base station may indicate that the UE may use M RBs spanning a bandwidth of the new CC. In some examples, the carrier aggregation configurations may be based on whether the carrier aggregation is intra-band contiguous, non-continuous, or inter-band.

The described techniques relate to improved methods, systems, devices, or apparatuses that support carrier aggregation configurations in wireless systems. Generally, the described techniques provide for indicating the location of a secondary cell (SCell) in carrier aggregation configurations in wireless systems.

A method of wireless communication is described. The method may include configuring a location and a set of RBs for a CC of an SCell for a UE, transmitting, to the UE, a reference location of the CC, where the reference location includes a relative location of the CC with respect to a second CC or an absolute frequency that corresponds to the location of the CC, and transmitting, to the UE, an indication of the set of RBs for the CC.

An apparatus for wireless communication is described. The apparatus may include means for configuring a location and a set of RBs for a CC of an SCell for a UE, means for transmitting, to the UE, a reference location of the CC, where the reference location includes a relative location of the CC with respect to a second CC or an absolute frequency that corresponds to the location of the CC, and means for transmitting, to the UE, an indication of the set of RBs for the CC.

Another apparatus for wireless communication is described. The apparatus may include a processor, memory in electronic communication with the processor, and instructions stored in the memory. The instructions may be operable to cause the processor to configure a location and a set of RBs for a CC of an SCell for a UE, transmit, to the UE, a reference location of the CC, where the reference location includes a relative location of the CC with respect to a second CC or an absolute frequency that corresponds to the location of the CC, and transmit, to the UE, an indication of the set of RBs for the CC.

A non-transitory computer readable medium for wireless communication is described. The non-transitory computer-readable medium may include instructions operable to cause a processor to configure a location and a set of RBs for a CC of an SCell for a UE, transmit, to the UE, a reference location of the CC, where the reference location includes a relative location of the CC with respect to a second CC or an absolute frequency that corresponds to the location of the CC, and transmit, to the UE, an indication of the set of RBs for the CC.

Some examples of the method, apparatus, and non-transitory computer-readable medium described above may further include processes, features, means, or instructions for transmitting an indication of a relationship between the set of RBs and the reference location or the absolute frequency.

Some examples of the method, apparatus, and non-transitory computer-readable medium described above may further include processes, features, means, or instructions for determining the reference location of the CC based on a carrier aggregation configuration.

In some examples of the method, apparatus, and non-transitory computer-readable medium described above, the carrier aggregation configuration includes one of an intra-band contiguous carrier aggregation, an intra-band non-contiguous carrier aggregation, or an inter-band carrier aggregation.

In some examples of the method, apparatus, and non-transitory computer-readable medium described above, the indication of the set of RBs includes a number of RBs for the CC.

In some examples of the method, apparatus, and non-transitory computer-readable medium described above, the second CC includes a PCell CC of the UE, an SCell CC of the UE, a wideband CC of the UE, or an arbitrary channel unassociated with any CC of the UE.

In some examples of the method, apparatus, and non-transitory computer-readable medium described above, the relative location of the CC may be relative to a channel raster entry of the second CC, a synchronization channel position of the second CC, or an arbitrary channel entry of the second CC.

In some examples of the method, apparatus, and non-transitory computer-readable medium described above, the reference location indicates a center frequency associated with the CC, a subcarrier position associated with the CC, or an RB position associated with the CC.

In some examples of the method, apparatus, and non-transitory computer-readable medium described above, the subcarrier position corresponds to a center subcarrier of the CC, an edge subcarrier of the CC, or a subcarrier index of an RB of the CC.

In some examples of the method, apparatus, and non-transitory computer-readable medium described above, the RB position corresponds to a center RB of the CC or an edge RB of the CC.

In some examples of the method, apparatus, and non-transitory computer-readable medium described above, the reference location may be indicated in terms of RBs or subcarriers and an associated SCS.

Some examples of the method, apparatus, and non-transitory computer-readable medium described above may further include processes, features, means, or instructions for transmitting, to the UE, a synchronization signal (SS) block according to an SS SCS, where the associated SCS may be based on the SS SCS.

In some examples of the method, apparatus, and non-transitory computer-readable medium described above, the SS SCS may be based on a wideband CC of the UE.

In some examples of the method, apparatus, and non-transitory computer-readable medium described above, transmitting the reference location includes: transmitting the reference location via a radio resource control (RRC) message.

In some examples of the method, apparatus, and non-transitory computer-readable medium described above, transmitting the indication of the set of RBs includes: transmitting the indication of the set of RBs via an RRC message.

Some examples of the method, apparatus, and non-transitory computer-readable medium described above may further include processes, features, means, or instructions for communicating, over the set of RBs, with the UE using the CC.

In some examples of the method, apparatus, and non-transitory computer-readable medium described above, at least one subcarrier of the CC aligns with a wideband CC of the UE.

In some examples of the method, apparatus, and non-transitory computer-readable medium described above, the absolute frequency may have a granularity of about 500 Hertz (Hz).

A method of wireless communication is described. The method may include receiving, from a base station, a reference location of a CC of an SCell for a UE, where the reference location includes a relative location of the CC with respect to a second CC or an absolute frequency that corresponds to the location of the CC, receiving, from the base station, an indication of a set of RBs for the CC, determining a set of parameters of the CC of the SCell based on the reference location and the set of RBs, and communicating with the base station using the CC based on the set of parameters.

An apparatus for wireless communication is described. The apparatus may include means for receiving, from a base station, a reference location of a CC of an SCell for a UE, where the reference location includes a relative location of the CC with respect to a second CC or an absolute frequency that corresponds to the location of the CC, means for receiving, from the base station, an indication of a set of RBs for the CC, means for determining a set of parameters of the CC of the SCell based on the reference location and the set of RBs, and means for communicating with the base station using the CC based on the set of parameters.

Another apparatus for wireless communication is described. The apparatus may include a processor, memory in electronic communication with the processor, and instructions stored in the memory. The instructions may be operable to cause the processor to receive, from a base station, a reference location of a CC of an SCell for a UE, where the reference location includes a relative location of the CC with respect to a second CC or an absolute frequency that corresponds to the location of the CC, receive, from the base station, an indication of a set of RBs for the CC, determine a set of parameters of the CC of the SCell based on the reference location and the set of RBs, and communicate with the base station using the CC based on the set of parameters.

A non-transitory computer readable medium for wireless communication is described. The non-transitory computer-readable medium may include instructions operable to cause a processor to receive, from a base station, a reference location of a CC of an SCell for a UE, where the reference location includes a relative location of the CC with respect to a second CC or an absolute frequency that corresponds to the location of the CC, receive, from the base station, an indication of a set of RBs for the CC, determine a set of parameters of the CC of the SCell based on the reference location and the set of RBs, and communicate with the base station using the CC based on the set of parameters.

Some examples of the method, apparatus, and non-transitory computer-readable medium described above may further include processes, features, means, or instructions for identifying a relationship between the set of RBs and the reference location or the absolute frequency, where the set of parameters may be determined based on the relationship.

In some examples of the method, apparatus, and non-transitory computer-readable medium described above, identifying the relationship includes: receiving, from the base station, an indication of the relationship between the set of RBs and the reference location or the absolute frequency.

In some examples of the method, apparatus, and non-transitory computer-readable medium described above, the indication of the set of RBs includes a number of RBs for the CC.

In some examples of the method, apparatus, and non-transitory computer-readable medium described above, the second CC includes a PCell CC of the UE, an SCell CC of the UE, a wideband CC of the UE, or an arbitrary channel unassociated with any CC of the UE.

Some examples of the method, apparatus, and non-transitory computer-readable medium described above may further include processes, features, means, or instructions for receiving at least one of the reference location or the indication of the set of RBs via an RRC message.

In some examples of the method, apparatus, and non-transitory computer-readable medium described above, the relative location of the CC may be relative to a channel raster entry of the second CC, a synchronization channel position of the second CC, or an arbitrary channel entry of the second CC.

In some examples of the method, apparatus, and non-transitory computer-readable medium described above, the reference location indicates a center frequency associated with the CC, a subcarrier position associated with the CC, or an RB position associated with the CC.

In some examples of the method, apparatus, and non-transitory computer-readable medium described above, the subcarrier position corresponds to a center subcarrier of the CC, an edge subcarrier of the CC, or a subcarrier index of an RB of the CC.

In some examples of the method, apparatus, and non-transitory computer-readable medium described above, the RB position corresponds to a center RB of the CC or an edge RB of the CC.

In some examples of the method, apparatus, and non-transitory computer-readable medium described above, the reference location may be indicated in terms of RBs or subcarriers and an associated SCS.

Some examples of the method, apparatus, and non-transitory computer-readable medium described above may further include processes, features, means, or instructions for receiving, from the base station, an SS block according to an SS SCS, where the associated SCS may be based on the SS SCS.

In some examples of the method, apparatus, and non-transitory computer-readable medium described above, the SS SCS may be based on a wideband CC of the UE.

In some examples of the method, apparatus, and non-transitory computer-readable medium described above, at least one subcarrier of the CC aligns with a wideband CC of the UE.

In some examples of the method, apparatus, and non-transitory computer-readable medium described above, the absolute frequency may have a granularity of about 500 Hz.

DETAILED DESCRIPTION

Figure 1:
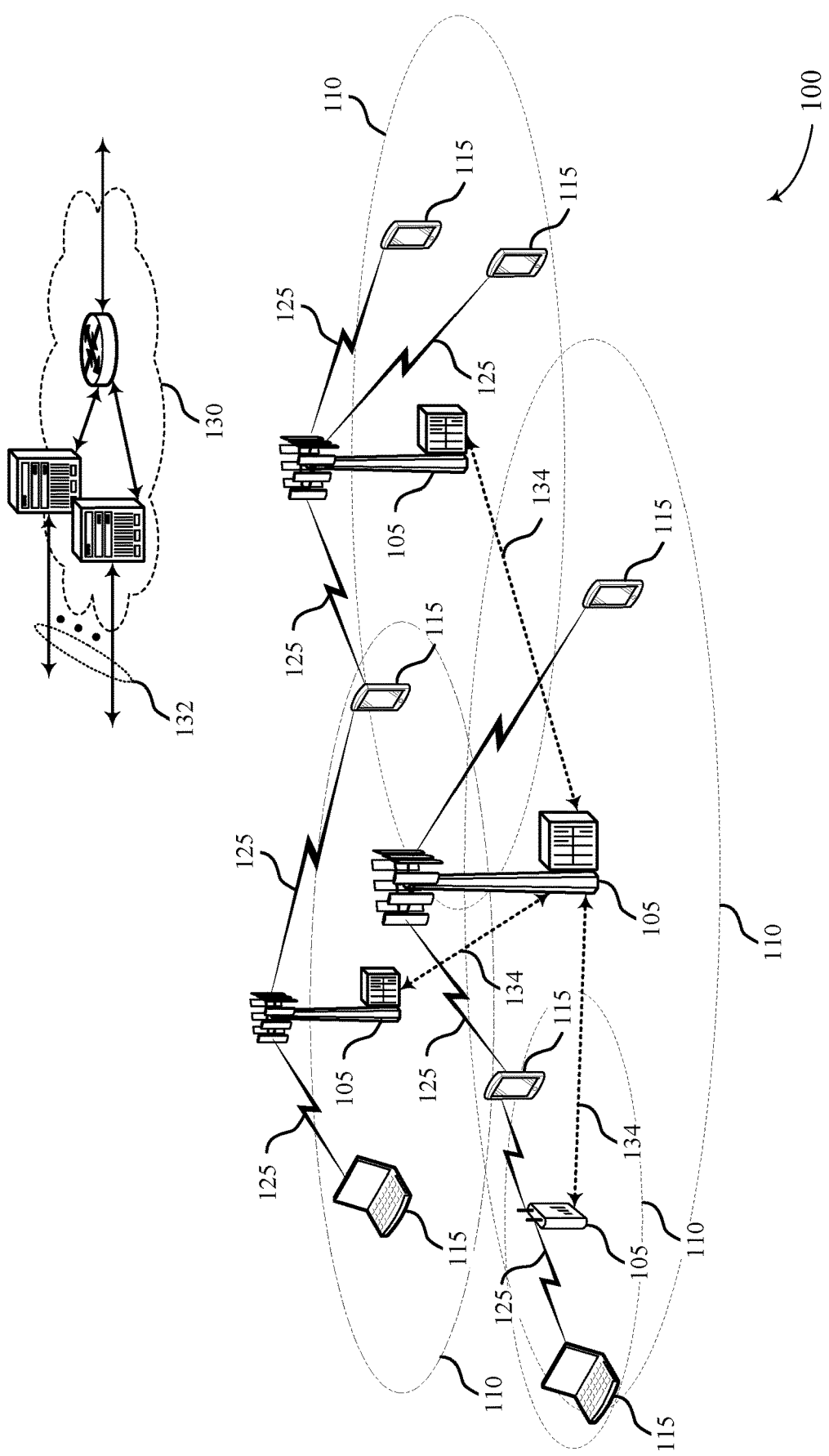
FIG. 1 illustrates an example of a wireless communications system that supports carrier aggregation configurations in wireless systems in accordance with aspects of the present disclosure.

A user equipment (UE) and a base station may communicate using a primary cell (PCell) on a first carrier as well as one or more secondary cells (SCells) on other carriers in a wireless communication system which supports carrier aggregation. The wireless communications system may support carrier aggregation for wider channel bandwidths (e.g., wideband communications). For example, the UE may be allocated a wide bandwidth (e.g., a wideband component carrier (CC)) for communication with the base station. Some carrier aggregation configurations may include CCs on valid channel raster entries, and the base station may be able to indicate the location of the CC by providing the UE with a channel raster value (e.g., by an Evolved Universal Terrestrial Radio Access (EUTRA) absolute radio frequency channel number (EARFCN)) that indicates where the secondary CC is located and a channel bandwidth or a number of resource blocks (RBs). However, if the secondary CC is not aligned on a valid channel raster entry, the base station may not be able to indicate the location of the secondary CC with a channel raster value.

To address this and other issues, a base station may signal the location of a new, secondary CC not on a valid channel raster entry to a UE based on a reference location relative to another frequency or another CC. The reference location of the new CC may be the center of the new CC, an edge of the new CC, the position of a subcarrier (e.g., center of a certain subcarrier such as subcarrier 0 of an Nth RB) within the CC, or the position of an RB (e.g., an edge of the RB).

For example, the base station may indicate a reference location of the new CC relative to an edge frequency or the center frequency of the CC of the PCell. In some other examples, the reference location of the new CC may be indicated relative to an edge frequency or the center frequency of the wideband CC. In some examples, the reference location of the new CC may be indicated relative to a channel raster entry and/or a sync channel position of the CC. In some other examples, the reference location of the new CC may be relative to an arbitrary channel entry. The arbitrary channel entry may not be linked to a CC which the UE is aware of. Additionally, or alternatively, the base station may transmit a reference location of the CC as an absolute frequency location. For example, the base station may indicate the reference location within approximately 500 Hz of the reference location of the CC.

In some examples, the relative location may be indicated based on RBs or subcarriers and the subcarrier spacing (SCS). In some examples, the SCS may be 15 kHz, 30 kHz, 60 kHz, 120 kHz, etc. In some examples, the SCS may be implicit based on the SCS of a synchronization block (e.g., of the PCell), the wideband SCS, or explicitly indicated on the PCell.

The base station may also indicate the width of the CC to the UE. For example, the base station may indicate a number of RBs the UE may use and the relationship between the reference location and the RBs of the CC (e.g., a relationship between the reference location and the number of RBs of the CC). For example, the base station may indicate that the UE may use M RBs spanning a bandwidth of the new CC. The base station may also indicate that the reference location corresponds to the low frequency end of the new CC, the middle frequency of the new CC, high frequency edge of the new CC, or other example reference locations as described herein.

The carrier aggregation configurations may be based on whether the carrier aggregation is intra-band contiguous, non-continuous, or inter-band. For example, for intra-band carrier aggregation, the configurations may be relative to the CC for the PCell, another configured SCell, or the wideband CC, as these CCs may be relatively close to the new CC. In some examples, the configurations may be relative to a channel raster entry of the CC or a sync channel position of the CC. In some examples of inter-band carrier aggregation, the configuration may use an arbitrary channel entry, or the reference location may be indicated as an absolute frequency location.

Aspects of the disclosure are initially described in the context of a wireless communications system. Various CC reference location configurations are illustrated and described. Aspects of the disclosure are further illustrated by and described with reference to apparatus diagrams, system diagrams, and flowcharts that relate to carrier aggregation configurations in wireless systems.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID) or a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals (SSs), reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as SSs, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels.

The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the SCS or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an EARFCN) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., SSs or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD CCs.

In some implementations of carrier aggregation, a base station 105 may configure a location and a set of RBs for a CC of an SCell for a UE 115. The base station 105 may transmit to the UE 115 a reference location of the CC for the SCell. The reference location may include a relative location of the CC for the SCell with respect to a second CC or an absolute frequency that corresponds to the location of the CC for the SCell. The base station 105 may also transmit to the UE 115 an indication of the set of RBs for the CC of the SCell. The UE 115 may receive the reference location of the CC of the SCell and the indication of the set of RBs for the CC of the SCell. Using this information, the UE 115 may determine a set of parameters of the CC of the SCell and communicate with the base station 105 using the CC of the SCell based on the set of parameters.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and SCS may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
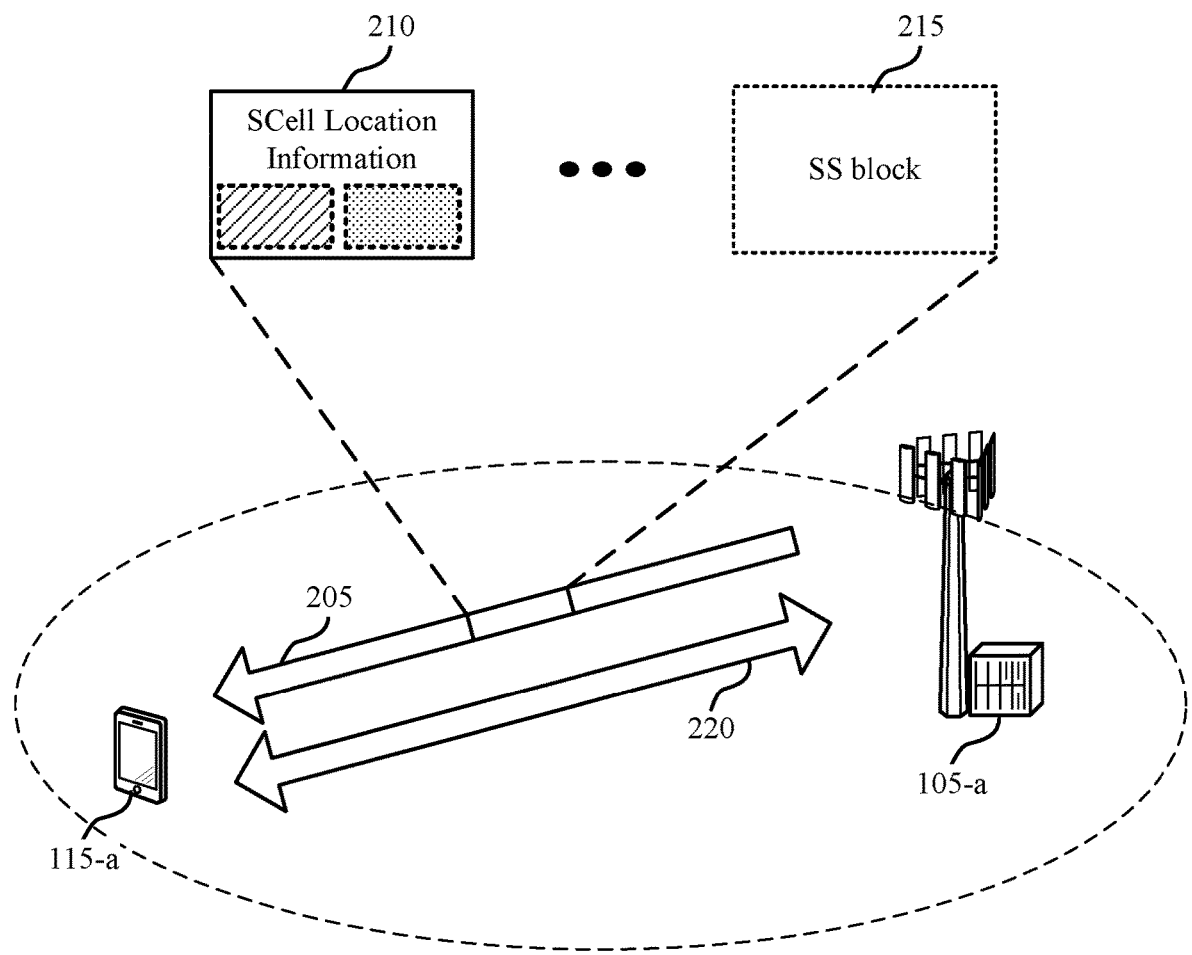
FIG. 2 illustrates an example of a wireless communications system that supports carrier aggregation configurations in wireless systems in accordance with aspects of the present disclosure.

FIG. 2 illustrates an example of a wireless communications system 200 that supports carrier aggregation configurations in wireless systems in accordance with various aspects of the present disclosure. In some examples, wireless communications system 200 may implement aspects of wireless communication system 100.

Wireless communications system 200 may support a carrier aggregation configuration. For example, UE 115-*a* and base station 105-*a* may communicate using a PCell on a first carrier as well as one or more SCells on other carriers. In some examples, the PCell may be configured for uplink and downlink communications, and the one or more SCells may be configured primarily for downlink communications. In some examples, the SCells may be configured for uplink communications. Base station 105-*a* may transmit downlink information to UE 115-*a* on a downlink communication link 205. In some examples, the downlink communication link 205 may be an example of a broadcast transmission, PCell, or SCell. Base station 105-*a* may also communicate with UE 115-*a* on a downlink/uplink communication link 220. In some examples, the downlink/uplink communication link 220 may be an example of a PCell or SCell.

Wireless communications system 200 may support carrier aggregation for wider channel bandwidths (e.g., wideband communications). For example, UE 115-*a* may be allocated a wide bandwidth (e.g., a wideband CC) for communication with base station 105-*a*. In some examples, CCs of the carrier aggregation configurations (e.g., a PCell and an SCell) may use the entire spectrum of the wideband CC. For example, if the wideband CC includes two CCs, the sum of the bandwidth for the two CCs may be the bandwidth of the wideband CC. In some other examples, the CCs may use a narrower subset of the wideband CC spectrum. For example, each of the two CCs may have a bandwidth that is less than half of the wideband CC bandwidth.

Some carrier aggregation configurations may include CCs on (e.g., deployed on) valid channel raster entries. A channel on a valid channel raster entry may be self-discoverable, such that UE 115-*a* may perform initial system acquisition on the channel. For example, the center of the first CC and the second CC may be at a multiple of a certain bandwidth (e.g., a multiple of 100 kHz), or the centers of the first CC and second CC may be at any frequency location as long as the subcarriers are aligned with the wideband CC.

When a secondary CC (e.g., of an SCell) is configured on a valid channel raster entry, UE 115-*a* may be informed of the actual location and width (e.g., how many RBs) of the CC to operate on the secondary CC. In some examples, parameters related to a secondary CC, such as the location and width (e.g., a number of RBs) of the secondary CC, may be indicated by RRC signaling from the PCell. One way of indicating a secondary CC is to provide UE 115-*a* with a channel raster value (e.g., an EARFCN) that may indicate where the secondary CC is located and a channel bandwidth or a number of RBs.

In some examples, a new CC (e.g., an SCell) may not be located on a valid channel raster entry. The location of a CC not on a valid channel raster entry may be signaled relative to another frequency or CC. For example, base station 105-*a* may indicate a reference location of the new CC relative to a location in another CC or relative to an absolute frequency. The reference location of the new CC may be the center of the CC or the position of a subcarrier (e.g., center of a certain subcarrier such as subcarrier 0 of an Nth RB) within the CC, or the position of an RB (e.g., an edge of the RB).

For example, base station 105-*a* may transmit SCell location information 210 to UE 115-*a*. SCell location information 210 may indicate a reference location of the new CC relative to an edge frequency or the center frequency of the CC of the PCell. In some other examples, the reference location of the new CC may be indicated relative to an edge frequency or the center frequency of the wideband CC. In some other examples, the reference location of the new CC may be relative to an arbitrary channel entry. The arbitrary channel entry may not be linked to a CC which UE 115-*a* is aware of. Additionally, or alternatively, base station 105-*a* may transmit a reference location of the CC as an absolute frequency location. For example, base station 105-*a* may indicate the reference location within approximately 500 Hz of the reference location of the CC. In some examples, base station 105-*a* may indicate the SCell location information 210 in an RRC message.

In some examples, the relative location may be provided in RBs or subcarriers and the SCS. In some examples, the SCS may be 15 kHz, 30 kHz, 60 kHz, 120 kHz, etc. In some examples, the SCS may be implicit based on the SCS of a SS block 215 (e.g., of the PCell), the wideband SCS, or explicitly indicated on the PCell.

Base station 105-*a* may also indicate the width of the CC to UE 115-*a*. For example, base station 105-*a* may indicate a number of RBs UE 115-*a* may use and the relationship between the reference location and the RBs of the CC. For example, base station 105-*a* may indicate that UE 115-*a* may use M RBs spanning a bandwidth of the new CC. Base station 105-*a* may also indicate that the reference location corresponds to the low frequency end of the new CC, the middle frequency of the new CC, high frequency edge of the new CC, or other example reference location as described herein.

The carrier aggregation configurations may be based on whether the carrier aggregation is intra-band contiguous, non-continuous, or inter-band. For example, for intra-band carrier aggregation, the configurations may be relative to the CC for the PCell or the wideband CC, as these CCs may be relatively close to the new CC. In some examples of inter-band carrier aggregation, the configuration may use an arbitrary channel entry, or the reference location may be indicated as an absolute frequency location.

Figure 3A:
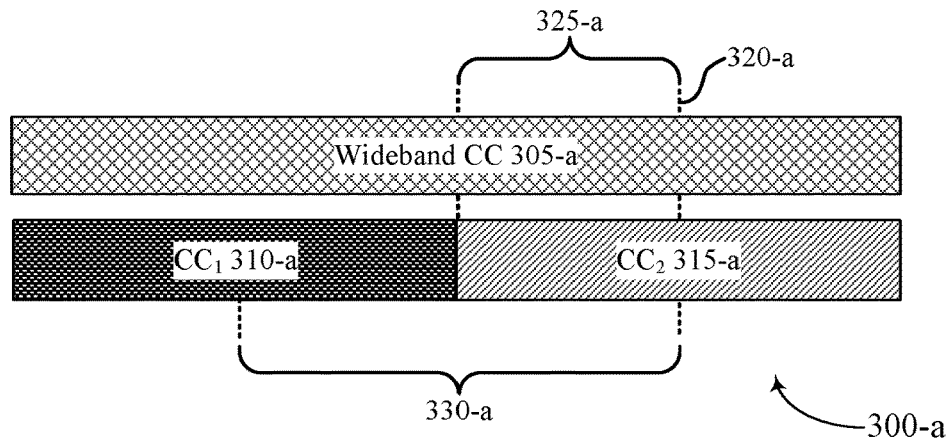
FIGS. 3A through 3C illustrate examples of component carrier (CC) reference location indications that supports carrier aggregation configurations in wireless systems in accordance with aspects of the present disclosure.
Figure 3B:
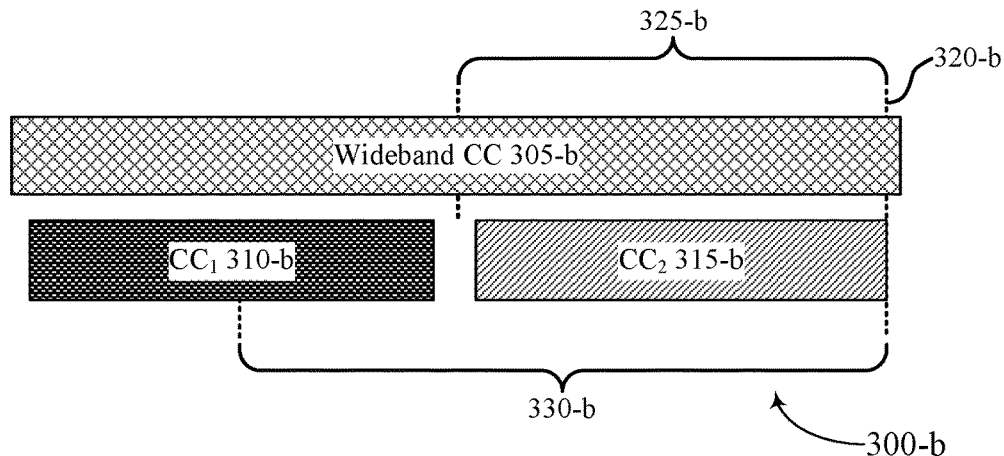
Figure 3C:
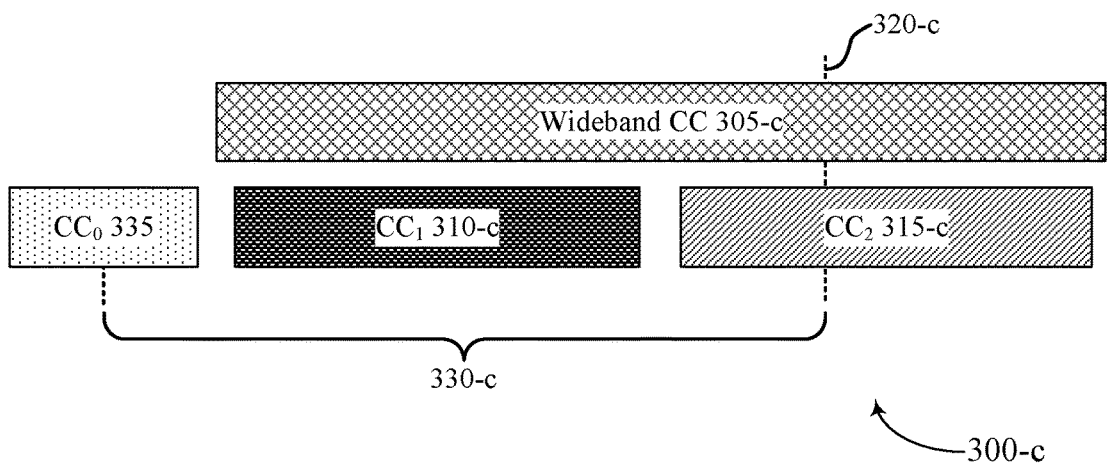

FIG. 3A through 3C illustrate examples of CC reference location indications 300 that support carrier aggregation configurations in wireless systems in accordance with various aspects of the present disclosure. In some examples, CC reference location indications 300 may implement aspects of wireless communication system 100. A base station 105 may indicate the frequency location of a new CC (e.g., for an SCell) to a UE 115. Implementations for indicating the frequency location for the new CC are illustrated in FIGS. 3A through 3C.

A base station 105 may allocate a wideband CC 305 to a UE 115. The wideband CC 305 may include a $CC_1$ 310. In some examples, a $CC_1$ 310 may be for a PCell of the UE 115. In other examples, the $CC_1$ 310 may be an SCell. The base station 105 may configure a secondary CC (e.g., and SCell) for the UE 115. For example, the base station 105 may configure a $CC_2$ 315 as a secondary CC for the UE 115. The base station 105 may indicate a reference location 320 of the $CC_2$ 315 in a number of different ways. For example, different configurations of a reference location 320 may point to different sections of the $CC_2$ 315 (e.g., an edge or middle of the $CC_2$ 315), and the different configurations of the reference location 320 may be indicated with reference to different frequencies or CCs (e.g., the wideband CC, the $CC_1$ 310, another CC entirely, or an absolute frequency).

For example, in CC reference location indication 300-*a*, the base station 105 may indicate reference location 320-*a*, corresponding to the center of $CC_2$ 315-*a*. In some examples, reference location 320-*a* may be indicated with reference to the center of wideband CC 305-*a*. For example, the base station 105 may indicate an offset or frequency span 325-*a* from the center of wideband CC 305-*a* to reference location 320-*a*. In some other examples, reference location 320-*a* may be indicated with reference to the center of $CC_1$ 310-*a*. For example, the base station 105 may indicate an offset of frequency span 330-*a* from the center of $CC_1$ 310-*a* to reference location 320-*a*. In some examples, $CC_1$ 310-*a* and $CC_2$ 315-*a* may have a combined bandwidth equal to that of wideband CC 305-*a*.

In CC reference location indication 300-*b*, the base station 105 indicates reference location 320-*b*, corresponding to an end of $CC_2$ 315-*b*. In some examples, reference location 320-*b* may be indicated with reference to the center of wideband CC 305-*b*. For example, the base station 105 may indicate an offset or frequency span 325-*b* from the center of wideband CC 305-*b* to reference location 320-*b*. In some other examples, reference location 315-*b* may be indicated with reference to the center of $CC_1$ 310-*b*. For example, the base station 105 may indicate an offset of frequency span 330-*b* from the center of $CC_1$ 310-*b* to reference location 320-*b*. In some examples, $CC_1$ 310-*b* and $CC_2$ 315-*b* may have a combined bandwidth less than that of wideband CC 305-*b*.

In CC reference location indication 300-*c*, the base station 105 indicates reference location 320-*c*, corresponding to the center of an arbitrary channel entry such as a CC which the UE 115 may not be aware of (e.g., $CC_0$). For example, the base station 105 may indicate an offset or frequency span 325-*c* from the center of $CC_0$ to reference location 320-*c*. In some examples, reference location 320-*c* may be indicated with reference to the position of a subcarrier within the CC. For example, reference location 315-*c* may be the center of a subcarrier such as subcarrier 0 of an Nth RB. In some examples, $CC_1$ 310-*c* and $CC_2$ 315-*c* may have a combined bandwidth less than that of wideband CC 305-*c*.

Figure 4:
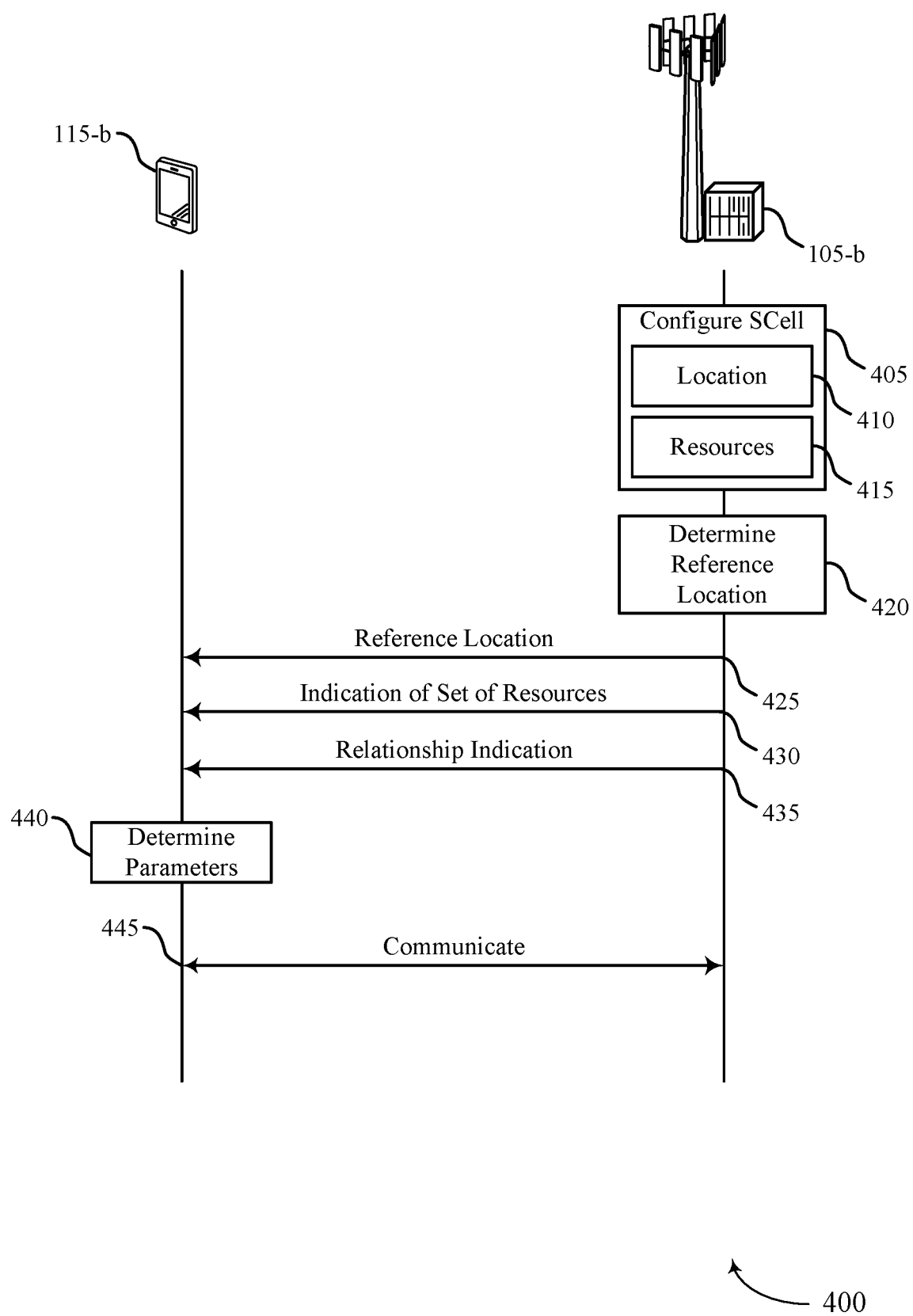
FIG. 4 illustrates an example of a process flow that supports carrier aggregation configurations in wireless systems in accordance with aspects of the present disclosure.

FIG. 4 illustrates an example of a process flow 400 that supports carrier aggregation configurations in wireless systems in accordance with various aspects of the present disclosure. In some examples, process flow 400 may implement aspects of wireless communication systems 100 or 200 as described with reference to FIGS. 1 and 2. Process flow 400 illustrates aspects of techniques performed by base station 105-*b* and a UE 115-*b*, which may be examples of base station 105 and a UE 115 as described with reference to FIGS. 1 through 3.

In the following description of the process flow 400, the operations between UE 115-*b* and base station 105-*b* may be performed in different orders or at different times. Certain operations may also be left out of the process flow 400, or other operations may be added to the process flow 400.

At 405, base station 105-*b* configures an SCell for UE 115-*b*. Configuring the SCell may include configuring a CC to be used for communication between base station 105-*b* and UE 115-*b*. In some cases, configuring the SCell may involve configuring a location of the CC at 410 and configuring a set of RBs for the CC at 415.

At 420, base station 105-*b* may determine a reference location of the CC for the SCell configured in 405, 410, and 415. In some cases, the reference location includes a relative location of the CC with respect to a second CC or an absolute frequency that corresponds to the location of the CC. In some cases, the second CC includes a PCell CC of UE 115-*b*, an SCell CC of UE 115-*b*, a wideband CC of UE 115-*b*, or an arbitrary channel unassociated with any CC of UE 115-*b*. In some examples, the relative location of the CC may be relative to a channel raster entry of the second CC, a synchronization channel position of the second CC, or an arbitrary channel entry of the second CC. In some aspects, the reference location indicates a center frequency associated with the CC, a subcarrier position associated with the CC, or an RB position associated with the CC. In some instances, the subcarrier position corresponds to a center subcarrier of the CC, an edge subcarrier of the CC, or a subcarrier index of an RB of the CC. In some cases, the RB position corresponds to a center RB of the CC or an edge RB of the CC. In some examples, the reference location may be indicated in terms of RBs or subcarriers and an associated SCS. In some instances, at least one subcarrier of the CC aligns with a wideband CC of UE 115-b. In some cases, the absolute frequency has a granularity of about 500 Hz.

At 425, base station 105-b may transmit the reference location (e.g., as determined at 420) of the CC for the SCell to UE 115-b. In some aspects, the reference location may be transmitted via an RRC message. In some examples, the reference location of the CC may be based on a carrier aggregation configuration (e.g., an intra-band contiguous carrier aggregation, an intra-band non-contiguous carrier aggregation, or an inter-band carrier aggregation).

At 430, base station 105-b may transmit an indication of the set of RBs for the CC (e.g., as configured in 415) to UE 115-b. In some cases, the indication of the set of RBs includes a number of RBs for the CC. In some examples, the indication of the set of RBs may be transmitted via an RRC message.

At 435, base station 105-b may transmit a relationship indication to UE 115-b. The relationship indication may indicate a relationship between the set of RBs and the reference location. In some examples, the relationship indication may indicate a relationship between the set of RBs and the absolute frequency.

At 440, UE 115-b may determine a set of parameters for the CC of the SCell for UE 115-b. The set of parameters may be determined based on the reference location received at 425, the indication of the set of resources received at 430, the relationship indication received at 435, or any combination thereof. The set of parameters may include a center frequency, a number of RBs, a SCS, a bandwidth or a bandwidth part (BWP) of the CC, or a combination thereof.

At 445, UE 115-b may communicate with base station 105-b using the CC of the SCell for UE 115-b (e.g., as configured at 405, 410, and 415). In some examples, UE 115-b may communicate via the CC over the set of RB indicated at 430. Communication between UE 115-b and base station 105-b may be in accordance with the parameters for the CC determined at 440.

Figure 5:
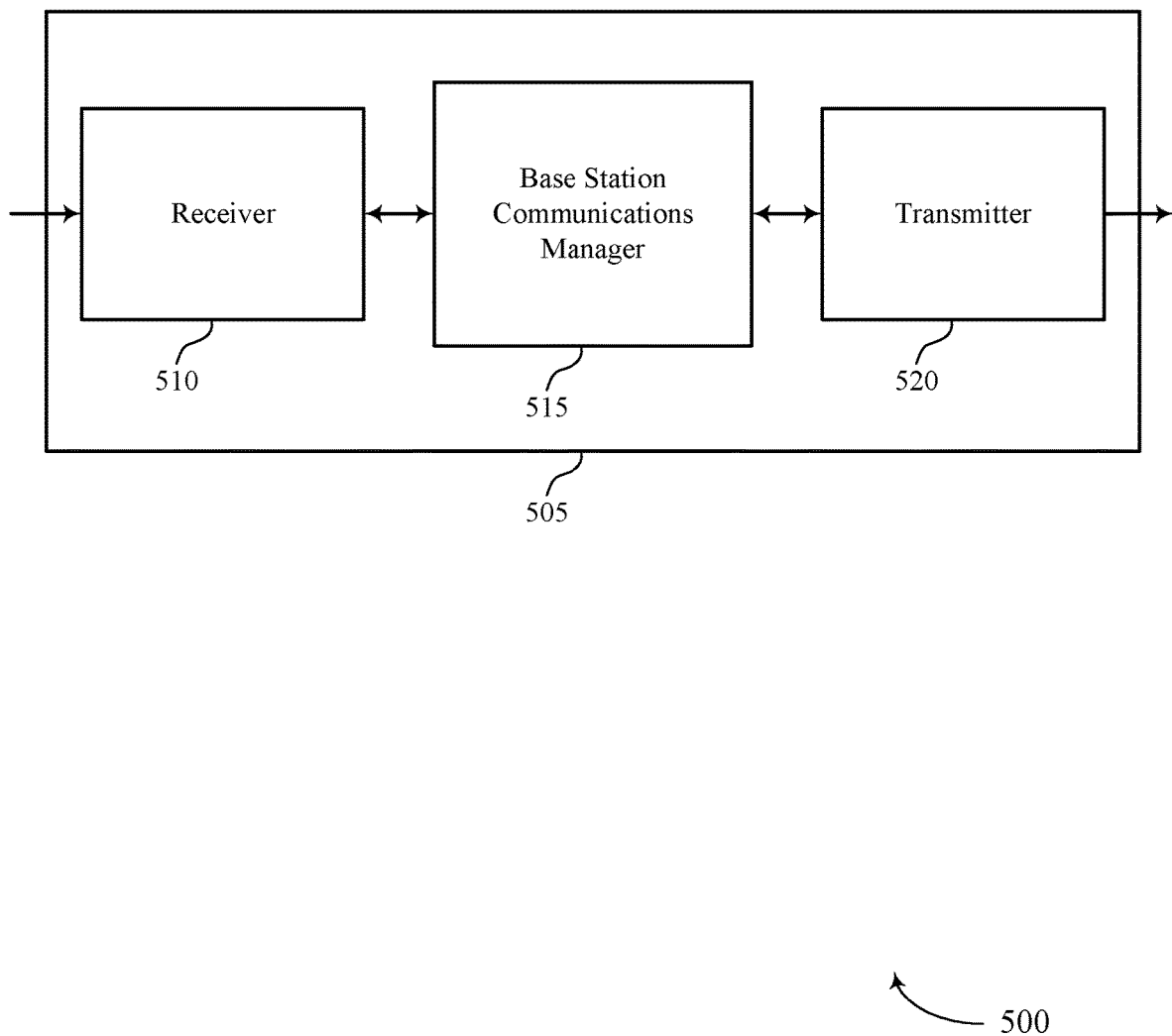
FIGS. 5 through 7 show block diagrams of a device that supports carrier aggregation configurations in wireless systems in accordance with aspects of the present disclosure.

FIG. 5 shows a block diagram 500 of a wireless device 505 that supports carrier aggregation configurations in wireless systems in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to carrier aggregation configurations in wireless systems, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8. Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may configure a location and a set of RBs for a CC of an SCell for a UE 115. Base station communications manager 515 may transmit, to the UE 115, a reference location of the CC, where the reference location includes a relative location of the CC with respect to a second CC or an absolute frequency that corresponds to the location of the CC. Base station communications manager 515 may transmit, to the UE 115, an indication of the set of RBs for the CC.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
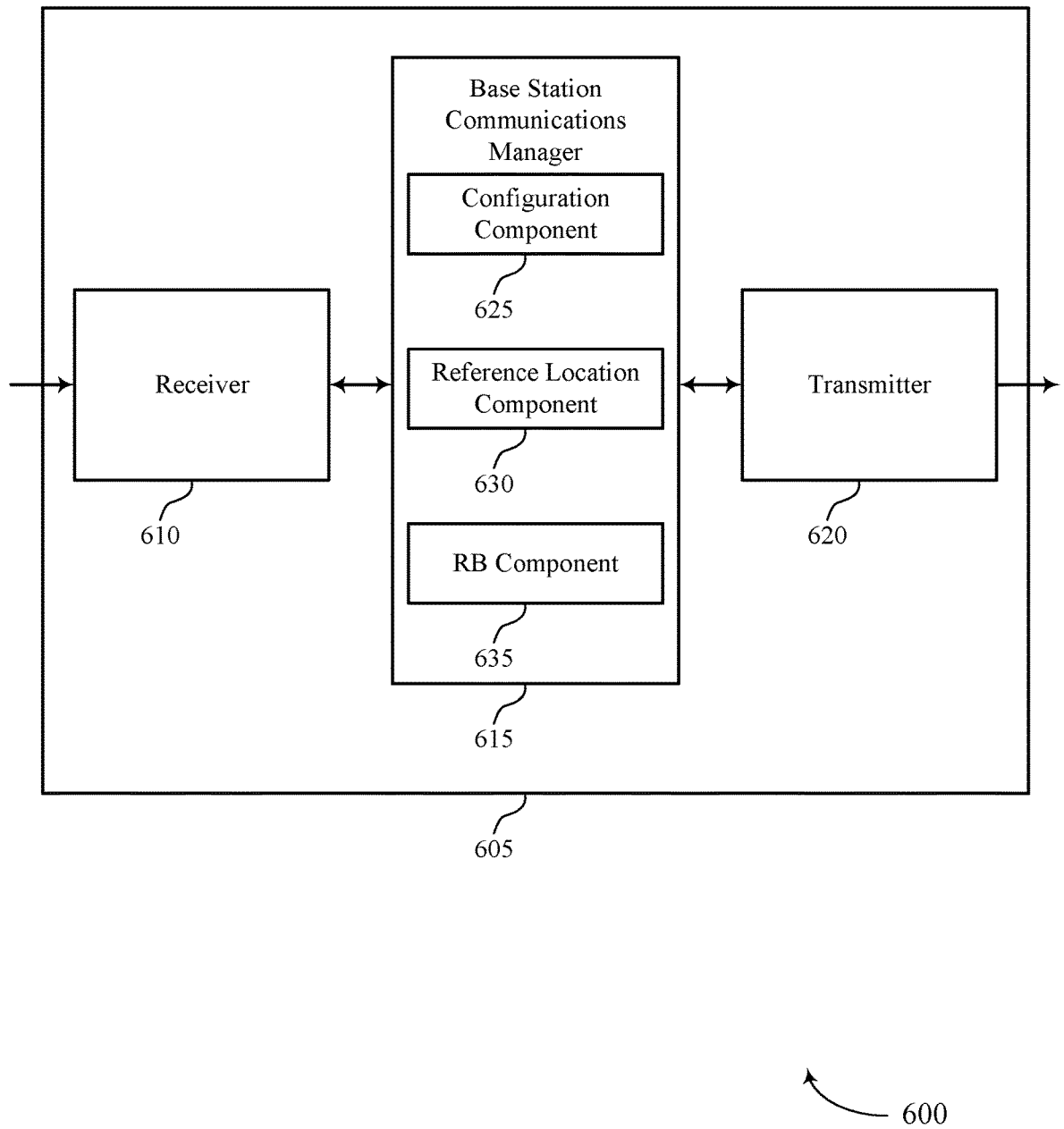

FIG. 6 shows a block diagram 600 of a wireless device 605 that supports carrier aggregation configurations in wireless systems in accordance with aspects of the present disclosure. Wireless device 605 may be an example of aspects of a wireless device 505 or a base station 105 as described with reference to FIG. 5. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to carrier aggregation configurations in wireless systems, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8. Base station communications manager 615 may also include configuration component 625, reference location component 630, and RB component 635.

Configuration component 625 may configure a location and a set of RBs for a CC of an SCell for a UE 115.

Reference location component 630 may transmit, to the UE 115, a reference location of the CC, where the reference location includes a relative location of the CC with respect to a second CC or an absolute frequency that corresponds to the location of the CC. In some cases, the second CC includes a PCell CC of the UE 115, an SCell CC of the UE 115, a wideband CC of the UE 115, or an arbitrary channel unassociated with any CC of the UE 115. In some examples, the relative location of the CC may be relative to a channel raster entry of the second CC, a synchronization channel position of the second CC, or an arbitrary channel entry of the second CC. In some aspects, the reference location indicates a center frequency associated with the CC, a subcarrier position associated with the CC, or an RB position associated with the CC. In some instances, the subcarrier position corresponds to a center subcarrier of the CC, an edge subcarrier of the CC, or a subcarrier index of an RB of the CC. In some cases, the RB position corresponds to a center RB of the CC or an edge RB of the CC. In some examples, the reference location may be indicated in terms of RBs or subcarriers and an associated SCS. In some aspects, transmitting the reference location includes: transmitting the reference location via an RRC message. In some instances, at least one subcarrier of the CC aligns with a wideband CC of the UE 115. In some cases, the absolute frequency has a granularity of about 500 Hz.

RB component 635 may transmit, to the UE 115, an indication of the set of RBs for the CC. In some cases, the indication of the set of RBs includes a number of RBs for the CC. In some examples, transmitting the indication of the set of RBs includes: transmitting the indication of the set of RBs via an RRC message.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
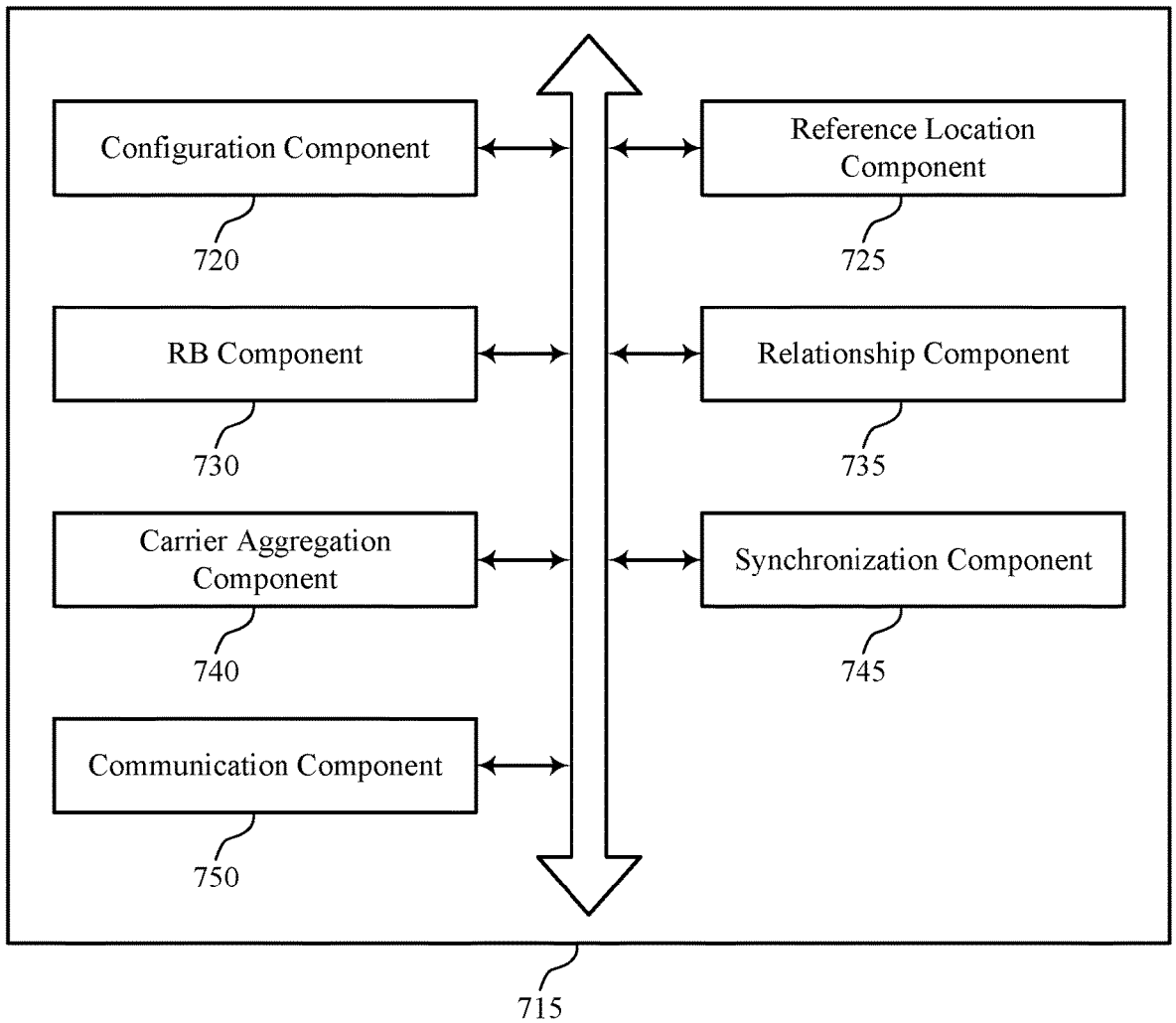

FIG. 7 shows a block diagram 700 of a base station communications manager 715 that supports carrier aggregation configurations in wireless systems in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include configuration component 720, reference location component 725, RB component 730, relationship component 735, carrier aggregation component 740, synchronization component 745, and communication component 750. Each of these modules may communicate, directly or indirectly, with one another (e.g., via one or more buses).

Configuration component 720 may configure a location and a set of RBs for a CC of an SCell for a UE 115.

Reference location component 725 may transmit, to the UE 115, a reference location of the CC, where the reference location includes a relative location of the CC with respect to a second CC or an absolute frequency that corresponds to the location of the CC. In some cases, the second CC includes a PCell CC of the UE 115, an SCell CC of the UE 115, a wideband CC of the UE 115, or an arbitrary channel unassociated with any CC of the UE 115. In some examples, the relative location of the CC may be relative to a channel raster entry of the second CC, a synchronization channel position of the second CC, or an arbitrary channel entry of the second CC. In some aspects, the reference location indicates a center frequency associated with the CC, a subcarrier position associated with the CC, or an RB position associated with the CC. In some instances, the subcarrier position corresponds to a center subcarrier of the CC, an edge subcarrier of the CC, or a subcarrier index of an RB of the CC. In some cases, the RB position corresponds to a center RB of the CC or an edge RB of the CC. In some examples, the reference location is indicated in terms of RBs or subcarriers and an associated SCS. In some aspects, transmitting the reference location includes: transmitting the reference location via an RRC message. In some instances, at least one subcarrier of the CC aligns with a wideband CC of the UE 115. In some cases, the absolute frequency has a granularity of about 500 Hz.

RB component 730 may transmit, to the UE 115, an indication of the set of RBs for the CC. In some cases, the indication of the set of RBs includes a number of RBs for the CC. In some examples, transmitting the indication of the set of RBs includes: transmitting the indication of the set of RBs via an RRC message.

Relationship component 735 may transmit an indication of a relationship between the set of RBs and the reference location or the absolute frequency.

Carrier aggregation component 740 may determine the reference location of the CC based on a carrier aggregation configuration. In some cases, the carrier aggregation configuration includes one of an intra-band contiguous carrier aggregation, an intra-band non-contiguous carrier aggregation, or an inter-band carrier aggregation.

Synchronization component 745 may transmit, to the UE 115, an SS block according to an SS SCS, where the associated SCS is based on the SS SCS. In some cases, the SS SCS is based on a wideband CC of the UE 115.

Communication component 750 may communicate, over the set of RBs, with the UE 115 using the CC.

Figure 8:
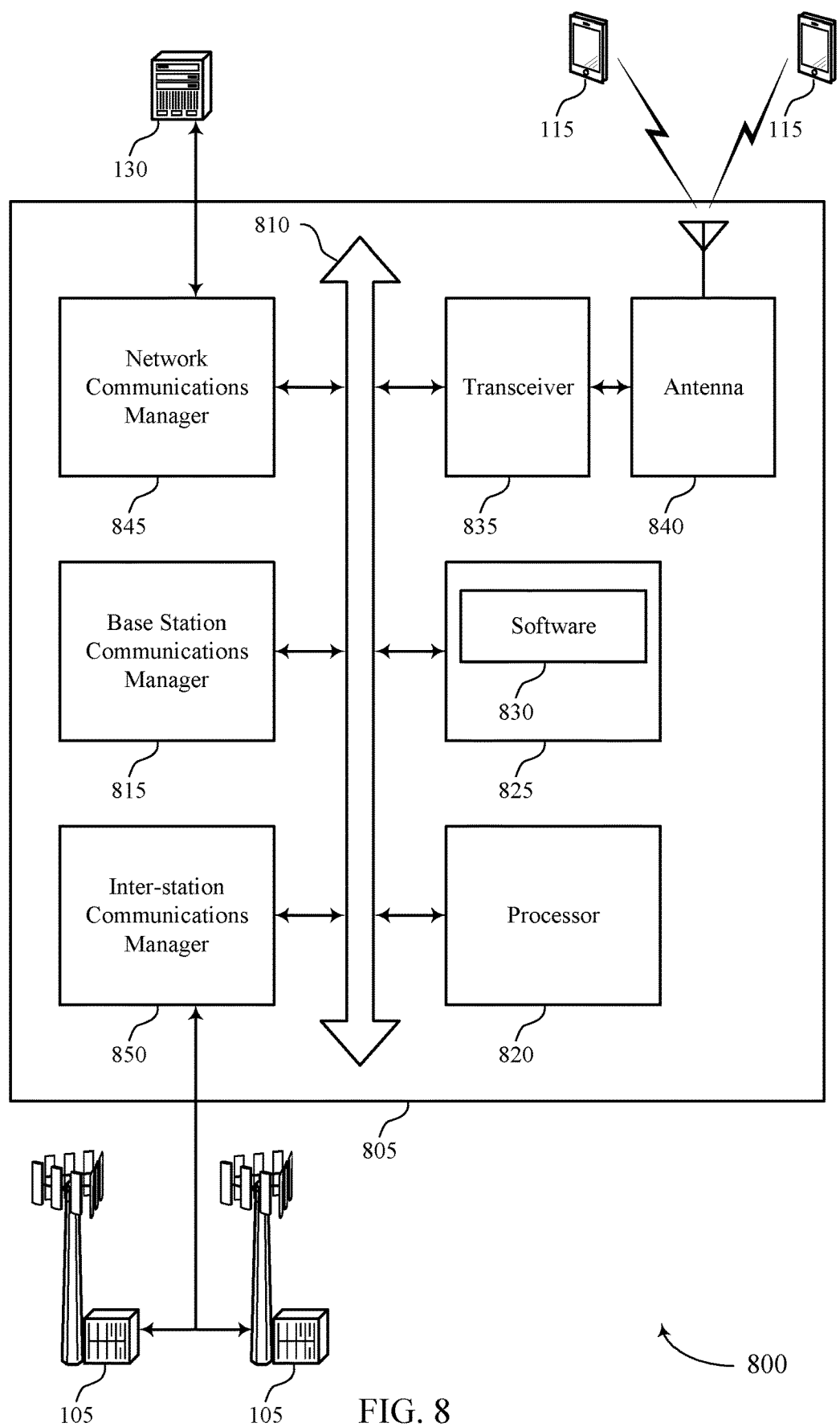
FIG. 8 illustrates a block diagram of a system including a base station that supports carrier aggregation configurations in wireless systems in accordance with aspects of the present disclosure.

FIG. 8 shows a diagram of a system 800 including a device 805 that supports carrier aggregation configurations in wireless systems in accordance with aspects of the present disclosure. Device 805 may be an example of or include the components of wireless device 505, wireless device 605, or a base station 105 as described above, e.g., with reference to FIGS. 5 and 6. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting carrier aggregation configurations in wireless systems).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support carrier aggregation configurations in wireless systems. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105 and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
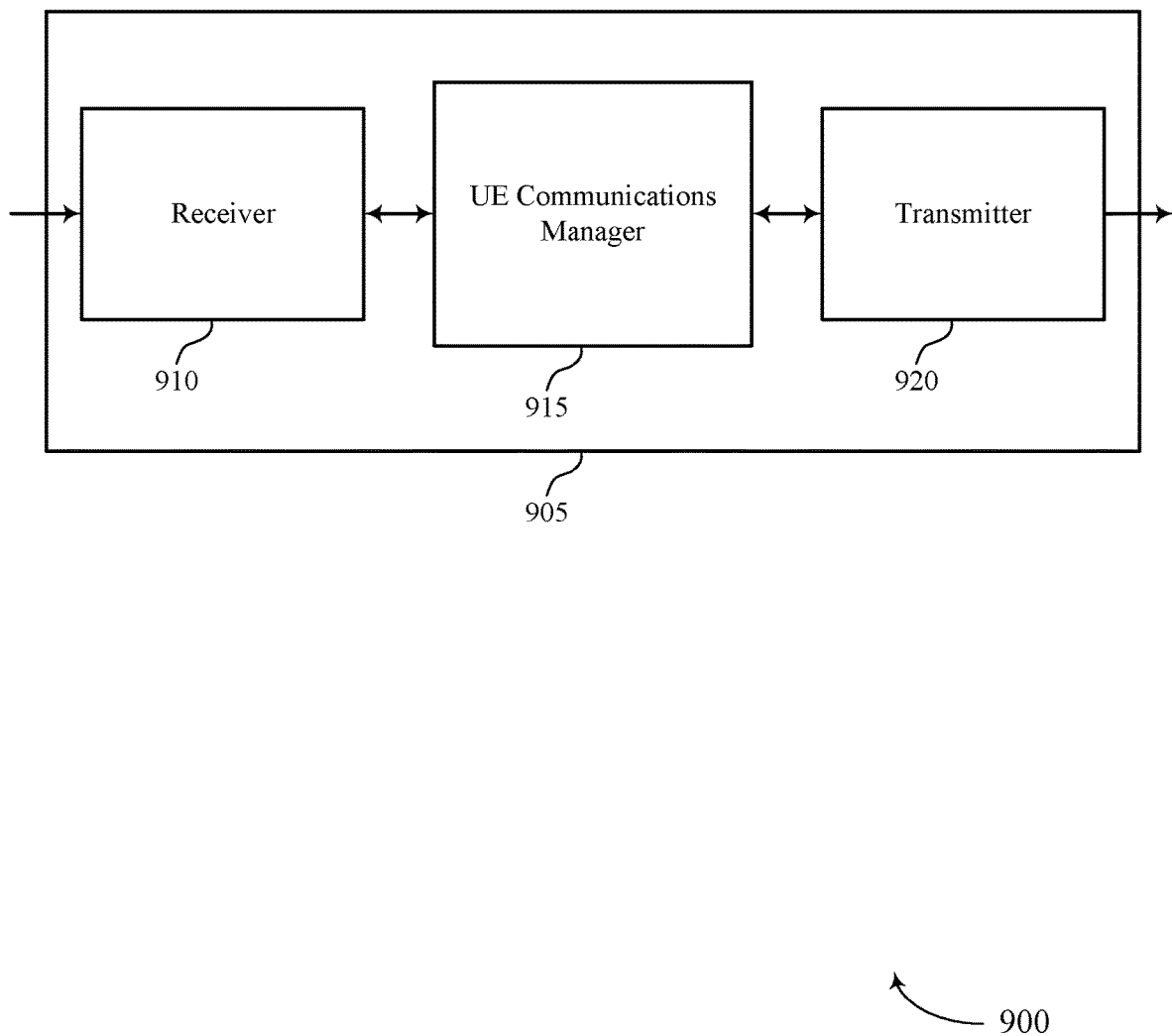
FIGS. 9 through 11 show block diagrams of a device that supports carrier aggregation configurations in wireless systems in accordance with aspects of the present disclosure.

FIG. 9 shows a block diagram 900 of a wireless device 905 that supports carrier aggregation configurations in wireless systems in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to carrier aggregation configurations in wireless systems, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12. UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive, from a base station 105, a reference location of a CC of an SCell for a UE 115, where the reference location includes a relative location of the CC with respect to a second CC or an absolute frequency that corresponds to the location of the CC. UE communications manager 915 may receive, from the base station 105, an indication of a set of RBs for the CC. UE communications manager 915 may determine a set of parameters of the CC of the SCell based on the reference location and the set of RBs. UE communications manager 915 may communicate with the base station 105 using the CC based on the set of parameters.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
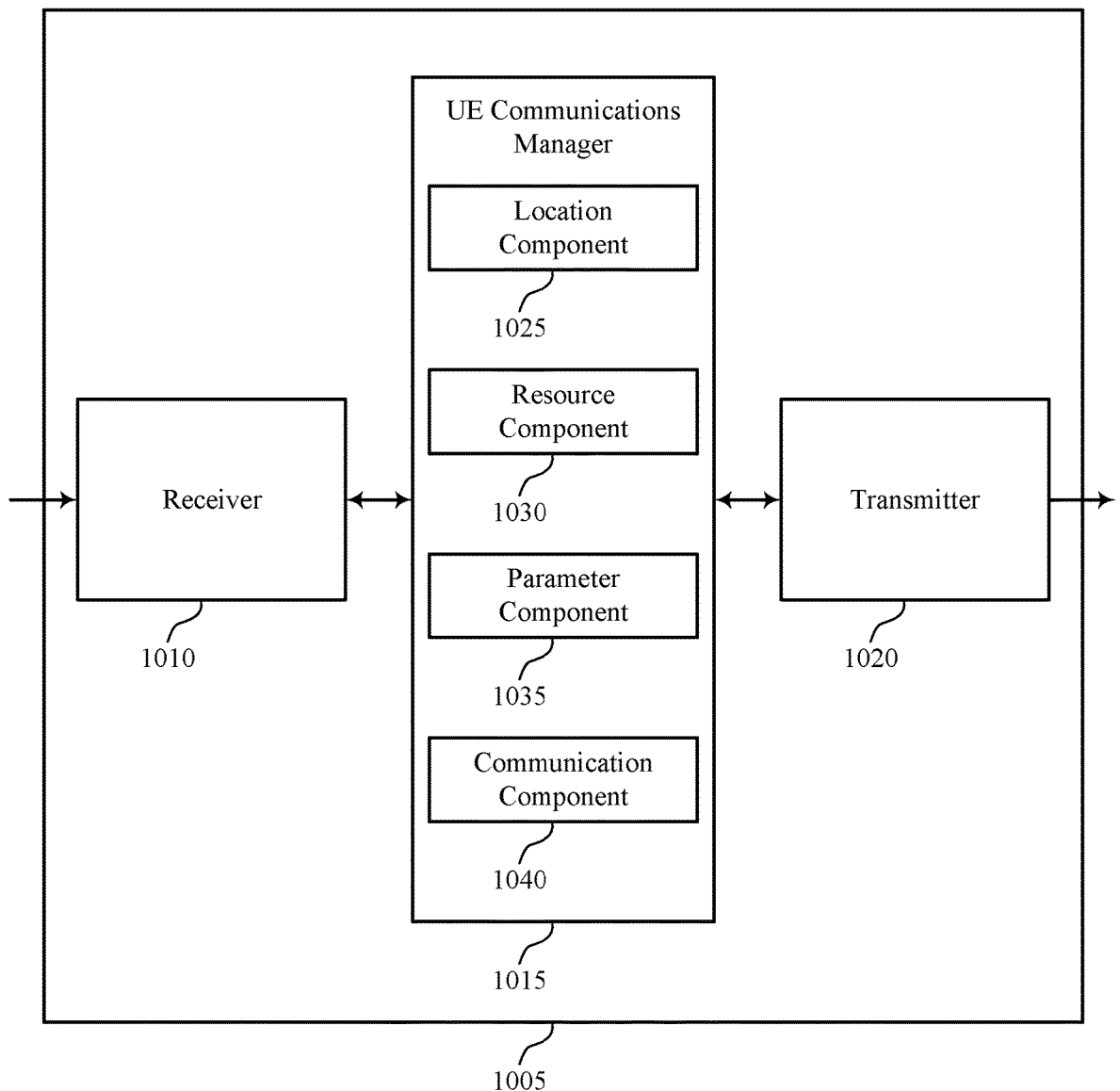

FIG. 10 shows a block diagram 1000 of a wireless device 1005 that supports carrier aggregation configurations in wireless systems in accordance with aspects of the present disclosure. Wireless device 1005 may be an example of aspects of a wireless device 905 or a UE 115 as described with reference to FIG. 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to carrier aggregation configurations in wireless systems, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include location component 1025, resource component 1030, parameter component 1035, and communication component 1040.

Location component 1025 may receive, from a base station 105, a reference location of a CC of an SCell for a UE 115, where the reference location includes a relative location of the CC with respect to a second CC or an absolute frequency that corresponds to the location of the CC, and may receive, from the base station 105, an SS block according to an SS SCS, where the associated SCS is based on the SS SCS. In some cases, the absolute frequency has a granularity of about 500 Hz. In some examples, the relative location of the CC is relative to a channel raster entry of the second CC, a synchronization channel position of the second CC, or an arbitrary channel entry of the second CC. In some aspects, the reference location indicates a center frequency associated with the CC, a subcarrier position associated with the CC, or an RB position associated with the CC. In some cases, the subcarrier position corresponds to a center subcarrier of the CC, an edge subcarrier of the CC, or a subcarrier index of an RB of the CC. In some instances, the second CC includes a PCell CC of the UE 115, an SCell CC of the UE 115, a wideband CC of the UE 115, or an arbitrary channel unassociated with any CC of the UE 115. In some cases, the reference location is indicated in terms of RBs or subcarriers and an associated SCS. In some examples, the SS SCS is based on a wideband CC of the UE 115. In some aspects, at least one subcarrier of the CC aligns with a wideband CC of the UE 115. In some instances, the RB position corresponds to a center RB of the CC or an edge RB of the CC.

Resource component 1030 may receive, from the base station 105, an indication of a set of RBs for the CC. In some cases, the indication of the set of RBs includes a number of RBs for the CC.

Parameter component 1035 may determine a set of parameters of the CC of the SCell based on the reference location and the set of RBs.

Communication component 1040 may communicate with the base station 105 using the CC based on the set of parameters.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
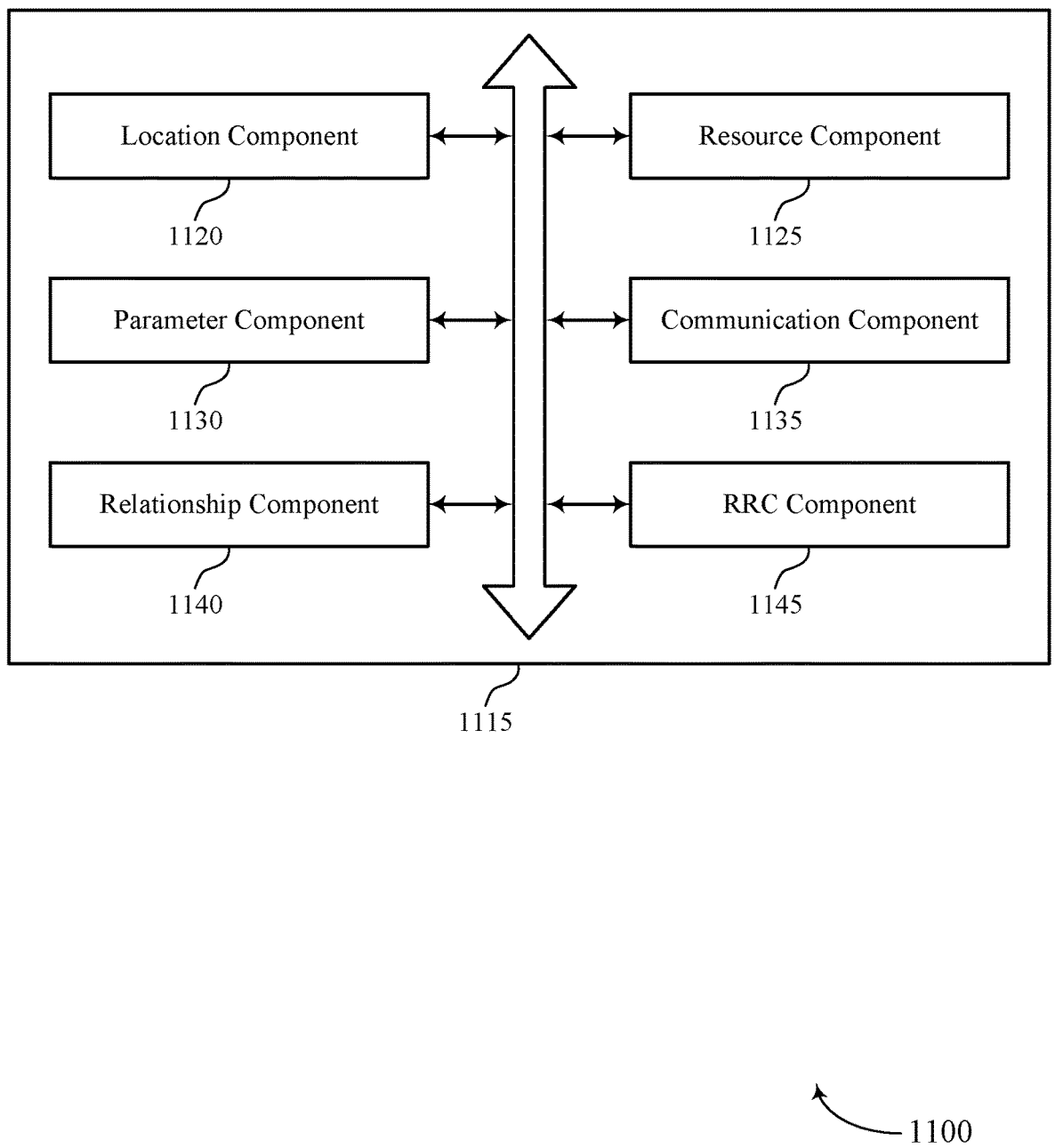

FIG. 11 shows a block diagram 1100 of a UE communications manager 1115 that supports carrier aggregation configurations in wireless systems in accordance with aspects of the present disclosure. The UE communications manager 1115 may be an example of aspects of a UE communications manager 1215 described with reference to FIGS. 9, 10, and 12. The UE communications manager 1115 may include location component 1120, resource component 1125, parameter component 1130, communication component 1135, relationship component 1140, and RRC component 1145. Each of these modules may communicate, directly or indirectly, with one another (e.g., via one or more buses).

Location component 1120 may receive, from a base station 105, a reference location of a CC of an SCell for a UE 115, where the reference location includes a relative location of the CC with respect to a second CC or an absolute frequency that corresponds to the location of the CC, and may receive, from the base station 105, an SS block according to an SS SCS, where the associated SCS is based on the SS SCS. In some cases, the absolute frequency has a granularity of about 500 Hz. In some aspects, the relative location of the CC is relative to a channel raster entry of the second CC, a synchronization channel position of the second CC, or an arbitrary channel entry of the second CC. In some examples, the reference location indicates a center frequency associated with the CC, a subcarrier position associated with the CC, or an RB position associated with the CC. In some instances, the subcarrier position corresponds to a center subcarrier of the CC, an edge subcarrier of the CC, or a subcarrier index of an RB of the CC. In some cases, the second CC includes a PCell CC of the UE 115, an SCell CC of the UE 115, a wideband CC of the UE 115, or an arbitrary channel unassociated with any CC of the UE 115. In some examples, the reference location is indicated in terms of RBs or subcarriers and an associated SCS. In some aspects, the SS SCS is based on a wideband CC of the UE 115. In some cases, at least one subcarrier of the CC aligns with a wideband CC of the UE 115. In some instances, the RB position corresponds to a center RB of the CC or an edge RB of the CC.

Resource component 1125 may receive, from the base station 105, an indication of a set of RBs for the CC. In some cases, the indication of the set of RBs includes a number of RBs for the CC.

Parameter component 1130 may determine a set of parameters of the CC of the SCell based on the reference location and the set of RBs.

Communication component 1135 may communicate with the base station 105 using the CC based on the set of parameters.

Relationship component 1140 may identify a relationship between the set of RBs and the reference location or the absolute frequency, where the set of parameters is determined based on the relationship. In some cases, identifying the relationship includes: receiving, from the base station 105, an indication of the relationship between the set of RBs and the reference location or the absolute frequency.

RRC component 1145 may receive at least one of the reference location or the indication of the set of RBs via an RRC message.

Figure 12:
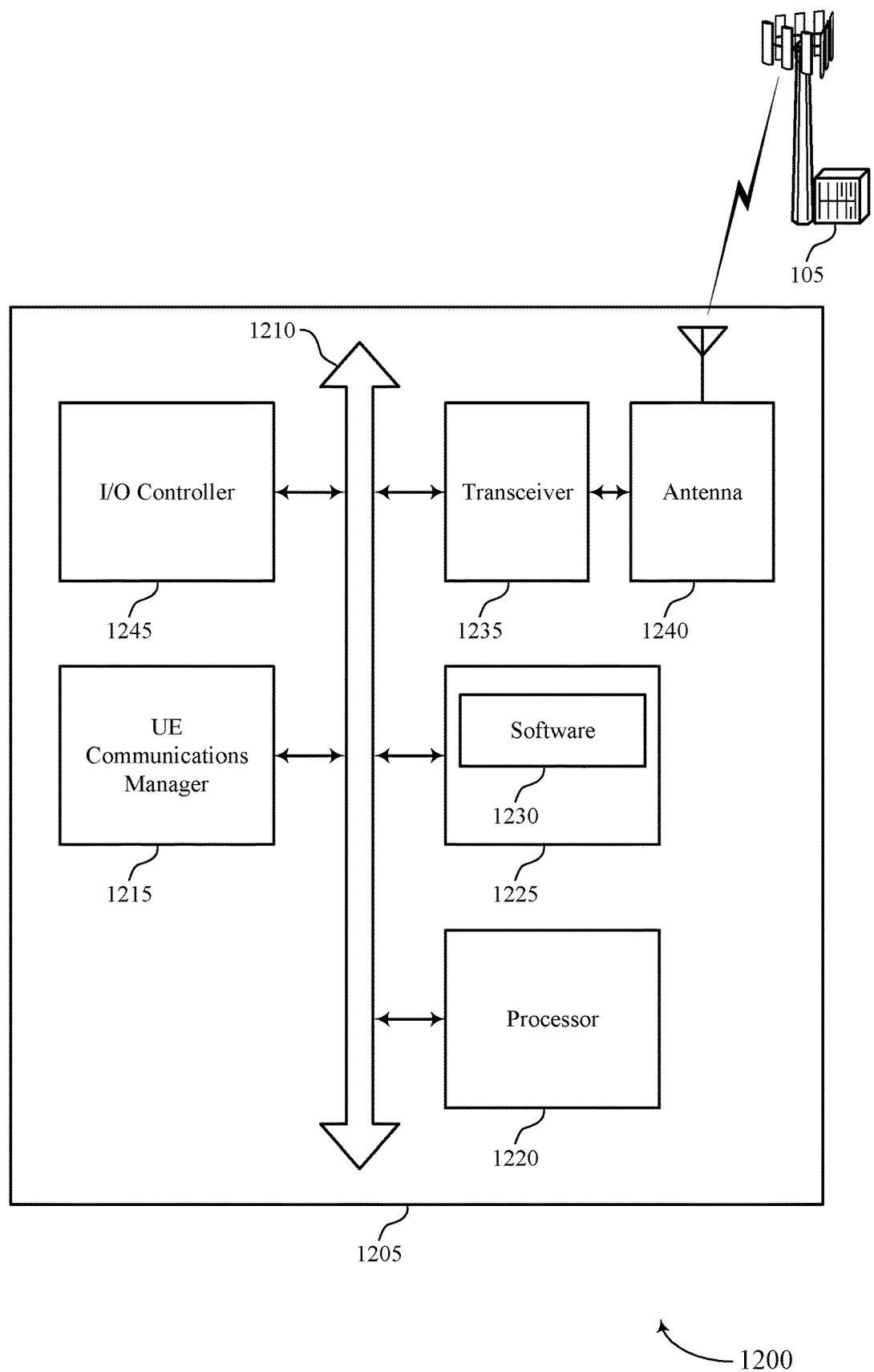
FIG. 12 illustrates a block diagram of a system including a user equipment (UE) that supports carrier aggregation configurations in wireless systems in accordance with aspects of the present disclosure.

FIG. 12 shows a diagram of a system 1200 including a device 1205 that supports carrier aggregation configurations in wireless systems in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting carrier aggregation configurations in wireless systems).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support carrier aggregation configurations in wireless systems. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
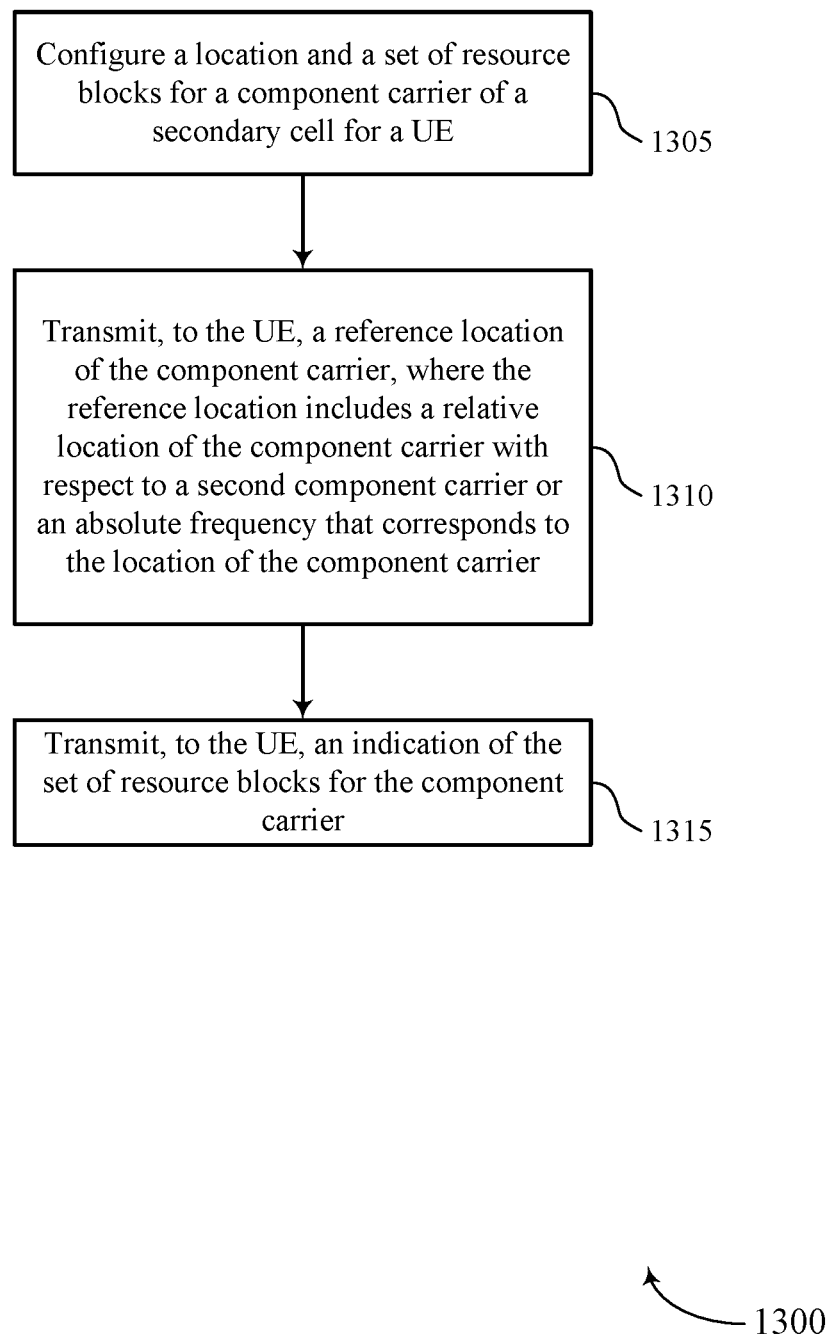
FIGS. 13 through 14 illustrate methods for carrier aggregation configurations in wireless systems in accordance with aspects of the present disclosure.

FIG. 13 shows a flowchart illustrating a method 1300 for carrier aggregation configurations in wireless systems in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally, or alternatively, the base station 105 may perform aspects of the functions described below using special-purpose hardware.

At 1305 the base station 105 may configure a location and a set of RBs for a CC of an SCell for a UE 115. The operations of 1305 may be performed according to the methods described herein. In certain examples, aspects of the operations of 1305 may be performed by a configuration component as described with reference to FIGS. 5 through 8.

At 1310 the base station 105 may transmit, to the UE 115, a reference location of the CC, where the reference location includes a relative location of the CC with respect to a second CC or an absolute frequency that corresponds to the location of the CC. The operations of 1310 may be performed according to the methods described herein. In certain examples, aspects of the operations of 1310 may be performed by a reference location component as described with reference to FIGS. 5 through 8.

At 1315 the base station 105 may transmit, to the UE 115, an indication of the set of RBs for the CC. The operations of 1315 may be performed according to the methods described herein. In certain examples, aspects of the operations of 1315 may be performed by an RB component as described with reference to FIGS. 5 through 8.

Figure 14:
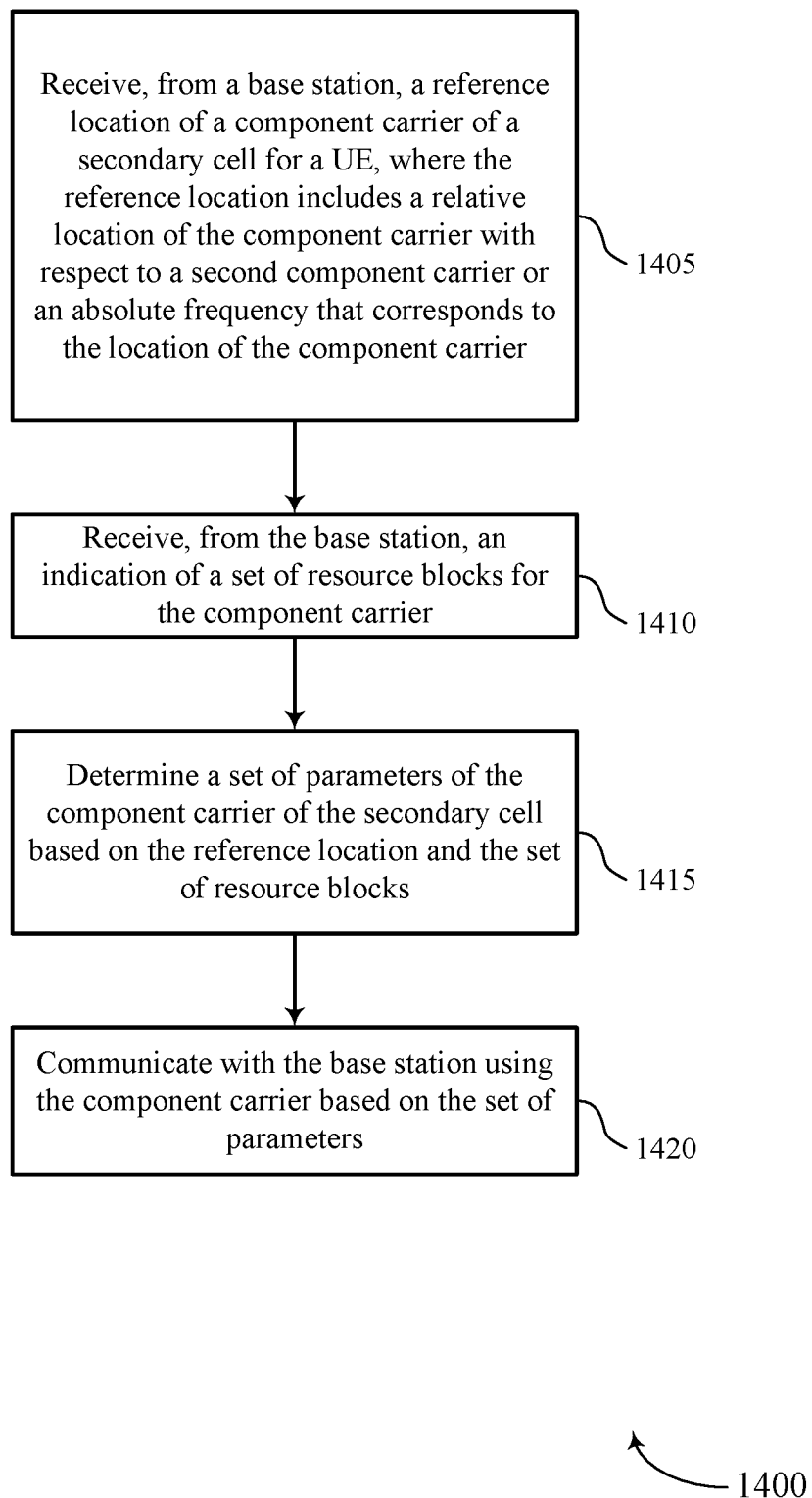

FIG. 14 shows a flowchart illustrating a method 1400 for carrier aggregation configurations in wireless systems in accordance with aspects of the present disclosure. The operations of method 1400 may be implemented by a UE 115 or its components as described herein. For example, the operations of method 1400 may be performed by a UE communications manager as described with reference to FIGS. 9 through 12. In some examples, a UE 115 may execute a set of codes to control the functional elements of the device to perform the functions described below. Additionally, or alternatively, the UE 115 may perform aspects of the functions described below using special-purpose hardware.

At 1405 the UE 115 may receive, from a base station 105, a reference location of a CC of an SCell for a UE 115, where the reference location includes a relative location of the CC with respect to a second CC or an absolute frequency that corresponds to the location of the CC. The operations of 1405 may be performed according to the methods described herein. In certain examples, aspects of the operations of 1405 may be performed by a location component as described with reference to FIGS. 9 through 12.

At 1410 the UE 115 may receive, from the base station 105, an indication of a set of RBs for the CC. The operations of 1410 may be performed according to the methods described herein. In certain examples, aspects of the operations of 1410 may be performed by a resource component as described with reference to FIGS. 9 through 12.

At 1415 the UE 115 may determine a set of parameters of the CC of the SCell based on the reference location and the set of RBs. The operations of 1415 may be performed according to the methods described herein. In certain examples, aspects of the operations of 1415 may be performed by a parameter component as described with reference to FIGS. 9 through 12.

At 1420 the UE 115 may communicate with the base station 105 using the CC based on the set of parameters. The operations of 1420 may be performed according to the methods described herein. In certain examples, aspects of the operations of 1420 may be performed by a communication component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   configuring a first location and a set of resource blocks for a component carrier of a secondary cell for a user equipment (UE); and
   transmitting control signaling to the UE, wherein the control signaling comprises an indication of a reference location of the component carrier based at least in part on an absence of a fixed location of the component carrier of the secondary cell on a channel raster entry, wherein the reference location indicates to the UE the first location of the component carrier, wherein the reference location comprises an offset from an absolute frequency corresponding to a low frequency end of the set of resource blocks for the component carrier of the secondary cell, and wherein the control signaling comprises an indication of the set of resource blocks for the component carrier.

2. The method of claim 1, further comprising:
   transmitting an indication of a relationship between the set of resource blocks and the reference location or the absolute frequency.

3. The method of claim 1, wherein:
   the indication of the set of resource blocks comprises a quantity of resource blocks for the component carrier.

4. The method of claim 1, wherein:
   the reference location indicates a center frequency associated with the component carrier, a subcarrier position associated with the component carrier, or a resource block position associated with the component carrier.

5. The method of claim 4, wherein the reference location indicates the subcarrier position and wherein:
   the subcarrier position corresponds to a center subcarrier of the component carrier, an edge subcarrier of the component carrier, or a subcarrier index of a resource block of the component carrier.

6. The method of claim 4, wherein the reference location indicates the resource block position and wherein:
   the resource block position corresponds to a center resource block of the component carrier or an edge resource block of the component carrier.

7. The method of claim 1, wherein:
   the reference location is indicated in terms of resource blocks or subcarriers and in terms of an associated subcarrier spacing.

8. The method of claim 1, wherein the control signaling comprises a radio resource control (RRC) message comprising the indication of the reference location.

9. The method of claim 1, wherein the control signaling comprises a radio resource control (RRC) message comprising the indication of the set of resource blocks.

10. The method of claim 1, further comprising:
    communicating, over the set of resource blocks, with the UE using the component carrier.

11. The method of claim 1, wherein:
    at least one subcarrier of the component carrier aligns with a wideband component carrier of the UE.

12. The method of claim 1, wherein the channel raster entry comprises an absolute radio frequency channel number.

13. A method for wireless communication, comprising:
    receiving, from a base station, a reference location of a component carrier of a secondary cell for a user equipment (UE) based at least in part on an absence of a fixed location of the component carrier of the secondary cell on a channel raster entry, wherein the reference location comprises an offset from an absolute frequency corresponding to a low frequency end of a set of resource blocks for the component carrier of the secondary cell;
    receiving, from the base station, an indication of the set of resource blocks for the component carrier;
    determining a set of parameters of the component carrier of the secondary cell based at least in part on the reference location and the set of resource blocks, wherein the set of parameters comprises a first location of the component carrier, and wherein determining the set of parameters comprises determining the first location of the component carrier based at least in part on the reference location; and
    communicating with the base station using the component carrier based at least in part on the set of parameters.

14. The method of claim 13, further comprising:
    identifying a relationship between the set of resource blocks and the reference location or the absolute frequency, wherein the set of parameters is determined based at least in part on the relationship.

15. The method of claim 14, wherein identifying the relationship comprises:
    receiving, from the base station, an indication of the relationship between the set of resource blocks and the reference location or the absolute frequency.

16. The method of claim 13, wherein:
the indication of the set of resource blocks comprises a quantity of resource blocks for the component carrier.

17. The method of claim 13, further comprising:
receiving at least one of the reference location or the indication of the set of resource blocks via a radio resource control (RRC) message.

18. The method of claim 13, wherein:
the reference location indicates a center frequency associated with the component carrier, a subcarrier position associated with the component carrier, or a resource block position associated with the component carrier.

19. The method of claim 18, wherein the reference location indicates the subcarrier position and wherein:
the subcarrier position corresponds to a center subcarrier of the component carrier, an edge subcarrier of the component carrier, or a subcarrier index of a resource block of the component carrier.

20. The method of claim 18, wherein the reference location indicates the resource block position and wherein:
the resource block position corresponds to a center resource block of the component carrier or an edge resource block of the component carrier.

21. The method of claim 13, wherein:
the reference location is indicated in terms of resource blocks or subcarriers and in terms of an associated subcarrier spacing.

22. The method of claim 13, wherein:
at least one subcarrier of the component carrier aligns with a wideband component carrier of the UE.

23. The method of claim 13, wherein the channel raster entry comprises an absolute radio frequency channel number.

24. An apparatus for wireless communication, comprising:
a processor;
memory coupled with the processor; and
instructions stored in the memory and operable, when executed by the processor, to cause the apparatus to:
configure a first location and a set of resource blocks for a component carrier of a secondary cell for a user equipment (UE); and
transmit control signaling to the UE, wherein the control signaling comprises an indication of a reference location of the component carrier based at least in part on an absence of a fixed location of the component carrier of the secondary cell on a channel raster entry, wherein the reference location indicates to the UE the first location of the component carrier, wherein the reference location comprises an offset from an absolute frequency corresponding to a low frequency end of the set of resource blocks for the component carrier of the secondary cell, and wherein the control signaling comprises an indication of the set of resource blocks for the component carrier.

25. The apparatus of claim 24, wherein the instructions are further executable by the processor to:
transmit an indication of a relationship between the set of resource blocks and the reference location or the absolute frequency.

26. The apparatus of claim 24, wherein:
the indication of the set of resource blocks comprises a quantity of resource blocks for the component carrier.

27. The apparatus of claim 24, wherein:
the reference location indicates a center frequency associated with the component carrier, a subcarrier position associated with the component carrier, or a resource block position associated with the component carrier.

28. The apparatus of claim 27, wherein the reference location indicates the subcarrier position and wherein:
the subcarrier position corresponds to a center subcarrier of the component carrier, an edge subcarrier of the component carrier, or a subcarrier index of a resource block of the component carrier.

29. The apparatus of claim 27, wherein the reference location indicates the resource block position and wherein:
the resource block position corresponds to a center resource block of the component carrier or an edge resource block of the component carrier.

30. The apparatus of claim 24, wherein:
the reference location is indicated in terms of resource blocks or subcarriers and in terms of an associated subcarrier spacing.

31. The apparatus of claim 24, wherein the control signaling comprises a radio resource control (RRC) message comprising the indication of the reference location.

32. The apparatus of claim 24, wherein the control signaling comprises a radio resource control (RRC) message comprising the indication of the set of resource blocks.

33. The apparatus of claim 24, wherein the instructions are further executable by the processor to:
communicate, over the set of resource blocks, with the UE using the component carrier.

34. The apparatus of claim 24, wherein:
at least one subcarrier of the component carrier aligns with a wideband component carrier of the UE.

35. The apparatus of claim 24, wherein the channel raster entry comprises an absolute radio frequency channel number.

36. An apparatus for wireless communication, comprising:
a processor;
memory coupled with the processor; and
instructions stored in the memory and operable, when executed by the processor, to cause the apparatus to:
receive, from a base station, a reference location of a component carrier of a secondary cell for a user equipment (UE) based at least in part on an absence of a fixed location of the component carrier of the secondary cell on a channel raster entry, wherein the reference location comprises an offset from an absolute frequency corresponding to a low frequency end of a set of resource blocks for the component carrier of the secondary cell;
receive, from the base station, an indication of the set of resource blocks for the component carrier;
determine a set of parameters of the component carrier of the secondary cell based at least in part on the reference location and the set of resource blocks, wherein the set of parameters comprises a first location of the component carrier, and wherein determining the set of parameters comprises determining the first location of the component carrier based at least in part on the reference location; and
communicate with the base station using the component carrier based at least in part on the set of parameters.

37. The apparatus of claim 36, wherein the instructions are further executable by the processor to:
identify a relationship between the set of resource blocks and the reference location or the absolute frequency, wherein the set of parameters is determined based at least in part on the relationship.

38. The apparatus of claim 37, wherein the instructions are further executable by the processor to:
receive, from the base station, an indication of the relationship between the set of resource blocks and the reference location or the absolute frequency.

39. The apparatus of claim 37, wherein:
the indication of the set of resource blocks comprises a quantity of resource blocks for the component carrier.

40. The apparatus of claim 36, wherein the instructions are further executable by the processor to:
receive at least one of the reference location or the indication of the set of resource blocks via a radio resource control (RRC) message.

41. The apparatus of claim 36, wherein:
the reference location indicates a center frequency associated with the component carrier, a subcarrier position associated with the component carrier, or a resource block position associated with the component carrier.

42. The apparatus of claim 41, wherein the reference location indicates the subcarrier position and wherein:
the subcarrier position corresponds to a center subcarrier of the component carrier, an edge subcarrier of the component carrier, or a subcarrier index of a resource block of the component carrier.

43. The apparatus of claim 41, wherein the reference location indicates the resource block position and wherein:
the resource block position corresponds to a center resource block of the component carrier or an edge resource block of the component carrier.

44. The apparatus of claim 36, wherein:
the reference location is indicated in terms of resource blocks or subcarriers and in terms of an associated subcarrier spacing.

45. The apparatus of claim 36, wherein:
at least one subcarrier of the component carrier aligns with a wideband component carrier of the UE.

46. The apparatus of claim 36, wherein the channel raster entry comprises an absolute radio frequency channel number.

47. An apparatus for wireless communication, comprising:
means for configuring a first location and a set of resource blocks for a component carrier of a secondary cell for a user equipment (UE); and
means for transmitting control signaling to the UE, wherein the control signaling comprises an indication of a reference location of the component carrier based at least in part on an absence of a fixed location of the component carrier of the secondary cell on a channel raster entry, wherein the reference location indicates to the UE the first location of the component carrier, wherein the reference location comprises an offset from an absolute frequency corresponding to a low frequency end of the set of resource blocks for the component carrier of the secondary cell, and wherein the control signaling comprises an indication of the set of resource blocks for the component carrier.

48. An apparatus for wireless communication, comprising:
means for receiving, from a base station, a reference location of a component carrier of a secondary cell for a user equipment (UE) based at least in part on an absence of a fixed location of the component carrier of the secondary cell on a channel raster entry, wherein the reference location comprises an offset from an absolute frequency corresponding to a low frequency end of a set of resource blocks for the component carrier of the secondary cell;
means for receiving, from the base station, an indication of the set of resource blocks for the component carrier;
means for determining a set of parameters of the component carrier of the secondary cell based at least in part on the reference location and the set of resource blocks, wherein the set of parameters comprises a first location of the component carrier, and wherein determining the set of parameters comprises determining the first location of the component carrier based at least in part on the reference location; and
means for communicating with the base station using the component carrier based at least in part on the set of parameters.

49. A non-transitory computer readable medium storing code for wireless communication, the code comprising instructions executable by a processor to:
configure a first location and a set of resource blocks for a component carrier of a secondary cell for a user equipment (UE);
transmit control signaling to the UE, wherein the control signaling comprises an indication of a reference location of the component carrier indicates to the UE the first location of the component carrier based at least in part on an absence of a fixed location of the component carrier of the secondary cell on a channel raster entry, wherein the reference location comprises an offset from an absolute frequency corresponding to a low frequency end of the set of resource blocks for the component carrier of the secondary cell; and
transmit, to the UE, an indication of the set of resource blocks for the component carrier.

50. A non-transitory computer readable medium storing code for wireless communication, the code comprising instructions executable by a processor to:
receive, from a base station, a reference location of a component carrier of a secondary cell for a user equipment (UE) based at least in part on an absence of a fixed location of the component carrier of the secondary cell on a channel raster entry, wherein the reference location comprises an offset from an absolute frequency corresponding to a low frequency end of a set of resource blocks for the component carrier of the secondary cell;
receive, from the base station, an indication of the set of resource blocks for the component carrier;
determine a set of parameters of the component carrier of the secondary cell based at least in part on the reference location and the set of resource blocks, wherein the set of parameters comprises a first location of the component carrier, and wherein determining the set of parameters comprises determining the first location of the component carrier based at least in part on the reference location; and
communicate with the base station using the component carrier based at least in part on the set of parameters.

* * * * *